(12) United States Patent
Brooks et al.

(10) Patent No.: US 10,401,492 B2
(45) Date of Patent: Sep. 3, 2019

(54) METHODS AND SYSTEMS FOR PHASED ARRAY RETURNING WAVE FRONT SEGMENTATION

(71) Applicant: yoR Labs, Inc., Portland, OR (US)

(72) Inventors: Clark Brooks, Portland, OR (US); Anshumali Roy, Portland, OR (US)

(*) Notice: Subject to any disclaimer, the term of this patent is extended or adjusted under 35 U.S.C. 154(b) by 358 days.

(21) Appl. No.: 15/169,632

(22) Filed: May 31, 2016

(65) Prior Publication Data
US 2017/0343668 A1    Nov. 30, 2017

(51) Int. Cl.
| G01S 15/00 | (2006.01) |
| G01S 15/89 | (2006.01) |
| G01S 7/524 | (2006.01) |
| G01S 7/56 | (2006.01) |
| G01S 7/53 | (2006.01) |
| G01S 7/52 | (2006.01) |

(52) U.S. Cl.
CPC .............. G01S 15/89 (2013.01); G01S 7/524 (2013.01); G01S 7/52025 (2013.01); G01S 7/52085 (2013.01); G01S 7/52098 (2013.01); G01S 7/53 (2013.01); G01S 7/56 (2013.01); G01S 15/8925 (2013.01)

(58) Field of Classification Search
USPC .......................................................... 367/11
See application file for complete search history.

(56) References Cited

U.S. PATENT DOCUMENTS

| 5,903,516 A * | 5/1999 | Greenleaf | G10K 15/02 367/92 |
| 9,986,969 B2 * | 6/2018 | Call | A61B 8/14 |
| 2003/0055334 A1 * | 3/2003 | Steinbacher | A61B 8/00 600/443 |
| 2004/0102700 A1 * | 5/2004 | Asafusa | A61B 8/13 600/437 |
| 2007/0239001 A1 * | 10/2007 | Mehi | G01S 7/52017 600/437 |
| 2008/0114239 A1 * | 5/2008 | Randall | G01S 7/52073 600/437 |
| 2010/0030076 A1 * | 2/2010 | Vortman | A61N 7/02 600/439 |
| 2010/0251823 A1 * | 10/2010 | Adachi | A61B 8/00 73/606 |
| 2011/0077524 A1 * | 3/2011 | Oshiki | A61B 8/06 600/458 |
| 2014/0058266 A1 * | 2/2014 | Call | A61B 8/14 600/448 |
| 2015/0293223 A1 * | 10/2015 | Park | G01S 7/52085 367/7 |
| 2017/0307755 A1 * | 10/2017 | Brooks | G01S 15/89 |
| 2018/0000453 A1 * | 1/2018 | Hunter | A61B 8/468 |

* cited by examiner

*Primary Examiner* — James R Hulka
(74) *Attorney, Agent, or Firm* — Knobbe, Martens, Olson & Bear, LLP

(57) ABSTRACT

Methods and systems for storing and processing a plurality of fractions of imaging data thereby minimizing the amount of cache memory necessary while controlling data loss and the resulting image quality.

17 Claims, 16 Drawing Sheets

METHODS AND SYSTEMS FOR PHASED ARRAY RETURNING WAVE FRONT SEGMENTATION

BACKGROUND

Frequency based imaging technologies such as ultrasound, radar, and sonar send and receive signals from transducers and determine the position and/or shape of an object, in part, by processing the reflections of the signals sent by the transducers, to create an image. Transducers may be part of a sequential array in which the acoustic beam is focused straight in front of the transducer, providing high sensitivity but a limited field of view, or a phased array in which each transducer sends an acoustic beam in a coordinated sequence, establishing a pattern of constructive interference that results in a beam at a set angle, allowing for a wider field of view.

Phased array transducers comprise multiple transducer elements which may be arranged in a variety of shapes including a strip (linear array), a ring (annular array), a circular matrix (circular array), conformal array, curved, or a more complex shape. Processing of the signals returned from the phased array may rely on an estimate of the values of parameters formed from available temporal and spatial information. The processing of the captured data and information assumes that the wavefield is generated by a finite number of signal sources and comprises information about signal parameters, characterizing and describing the sources.

Data from an array is generally communicated through a standard interface protocol from front end circuitry to a main central processing unit. However, any standard interface protocol has a maximum data rate at which it can receive and transmit data, and for any standard interface between front end circuitry and the main central processing unit, there is an array size which will produce data too quickly for that interface to receive and transmit. For example, a USB 3.0 is limited to a data transfer rate of about 5 billion bits per second. An array of 2,000 transducers sampling a 5 MHz signal at four times the signal frequency at a rate of 16 bits/second produces a peak data rate of 640 gigabits (Gb)/second, a rate which is 120 times faster than most current standard interfaces can handle. As phased arrays become more complex and/or the number of transducers per array increases, the amount and rate of data produced will correspondingly increase. There is therefore a need for means to efficiently receive and process data from an array and transmit the processed data at a rate that can be received and transmitted by an interface to produce an image with controlled data loss.

BRIEF SUMMARY

Provided herein is a means for sampling data and capturing the sampled data from specific segments of time corresponding to penetration depths reached by a pulse at a specific frequency (depth (d)=(wavelength ($\lambda$)*frequency (f)*time (t))/2, where time is the time it takes for a pulse to travel from a transducer to the reflection point and then from the reflection point back to the transducer). The data from sequential and/or overlapping segments of time is then processed and transmitted through a standard interface to a central processing unit where the data may be assembled into an image frame.

In some embodiments, an image processing method for frequency based images may include generating a first pulse from a group of transducers in a phased array; receiving a first returning wave front from an intersection of the first pulse with a change in acoustic impedance in a first fraction of time, wherein the first returning wave front has traveled a pre-determined distance based on the frequency of the first pulse in the first fraction of time; capturing a first group of samples from a transducer response to the first returning wave front in the first fraction of time by converting the first group of samples from the first returning wave front to a group of first digital signals; buffering each of the group of the first digital signals from the first fraction of time; collecting the first digital signals from the first group of samples from the first fraction of time; transmitting the collection of the first digital signals from the first fraction of time through a standard interface to a central processing unit; generating a second pulse from the group of transducers in the phased array; receiving a second returning wave front from the intersection of the second pulse with the change in the acoustic impedance in the second fraction of time, wherein the second returning wave front has traveled a pre-determined distance based on the frequency of the second pulse in the second fraction of time and wherein the second fraction of time is consecutive to the first fraction of time; capturing a second group of samples of the transducer response to the second returning wave front in a second fraction of time by converting the second group of samples from the second returning wave front in the second fraction of time to a group of second digital signals; buffering each of the group of the second digital signals from the second fraction of time; collecting each of the group of second digital signals from the second group of samples from the second fraction of time; transmitting the collection of the second digital signals from the second fraction of time through the standard interface to the central processing unit; generating a third pulse from the group of transducers in the phased array; receiving a third returning wave front to the intersection of the third pulse with the change in the acoustic impedance in a third fraction of time, wherein the third returning wave front has traveled a pre-determined distance based on the frequency of the third in the third fraction of time and wherein the third fraction of time is subsequent to the second fraction of time; capturing a third group of samples of the transducer response to the third returning wave front in a third fraction of time by converting the third group of samples from the third returning wave front in the third fraction of time to a set of third digital signals; buffering each of the group of the third digital signals from the third fraction of time; collecting the third digital signals from the third group of samples from the third first fraction of time; transmitting the collection of the third digital signal from the third fraction of time through the standard interface to the central processing unit; and/or assembling the transmitted collections of digital signals from the first, second and third fractions of time into an image frame.

In some embodiments, the first, second and third fractions of time may be consecutive. In other embodiments, the first, second and third fractions of time may overlap, such that between 0% to about 50% of a fraction of time may overlap with the preceding and/or successive fraction of time. In further embodiments, the time period captured at the edges of a focus of a signal may be at a different time period than the time period captured in the middle of the focus of the signal. The shape of the edge plane between adjacent fractions of time (Q-blocks of time) may have varying degrees of concavity depending on the purpose of the scan and/or the location of an object of interest. In additional embodiments, the pulses transmitted by the phased array may be at the same or different frequencies. Such frequencies may be optimized depending on the depth to be sampled trading off improved image quality with the decreased image penetration of higher frequencies.

In some embodiments, a method of memory optimization for data received from a phased array may include generating a group of first pulses from a group of transducers, receiving a first group of returning wave fronts from an intersection of the group of first pulses with a change in acoustic impedance, capturing a first data from the first group of returning wave fronts from a first depth, time shifting the first group of returning wave fronts produce a first coherent wave front, filling a buffer with the first data, waiting for an echo from the group of first pulses to fade, generating a group of second pulses from the group of transducers, receiving a second group of returning wave fronts from the intersection of the group of second pulses with the change in acoustic impedance, rejecting the first group of returning wave fronts from the first depth, capturing a second data from the second group of returning wave fronts from a second depth, time shifting the group of returning wave fronts to produce a second coherent wave front, filling the buffer with the second data, transmitting the second data to the central processing unit, and assembling the first and second data into an image frame. This method may be repeated for each image frame desired.

In some embodiments, when the buffer is filling with the second data, the first data may be transmitted to the central processing unit according to a queuing technique such as, but not limited to, first-in-first-out method (FIFO). The size of the buffer for each transducer may vary between transducers. In some embodiments, such as for diagnostic imaging, more memory is allocated for transducers on the edges of the phased array than for the transducers in the middle of the phased array, allowing for increased amounts of data to be captured from the areas at the edge of the image.

In some embodiments, a system for ultrasound processing may include a phased array of transducers, a means for collecting fractions of returning wave fronts from different points in time, a memory cache for buffering each fraction, and/or a means for assembling the returning wave fronts from different points of time into an image frame. In some embodiments, the returning wave front from a prior point in time is rejected as the returning wave fronts from a subsequent point in time are captured. In additional embodiments, as each fraction enters the memory cache, the previous fraction is transmitted to a central processing unit.

To the accomplishment of the foregoing and related ends, certain illustrative aspects of the system are described herein in connection with the following description and the attached drawings. The features, functions and advantages that have been discussed can be achieved independently in various embodiments of the present disclosure or may be combined in yet other embodiments, further details of which can be seen with reference to the following description and drawings. This summary is provided to introduce a selection of concepts in a simplified form that are elaborated upon in the Detailed Description. This summary is not intended to identify key features or essential features of any subject matter described herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
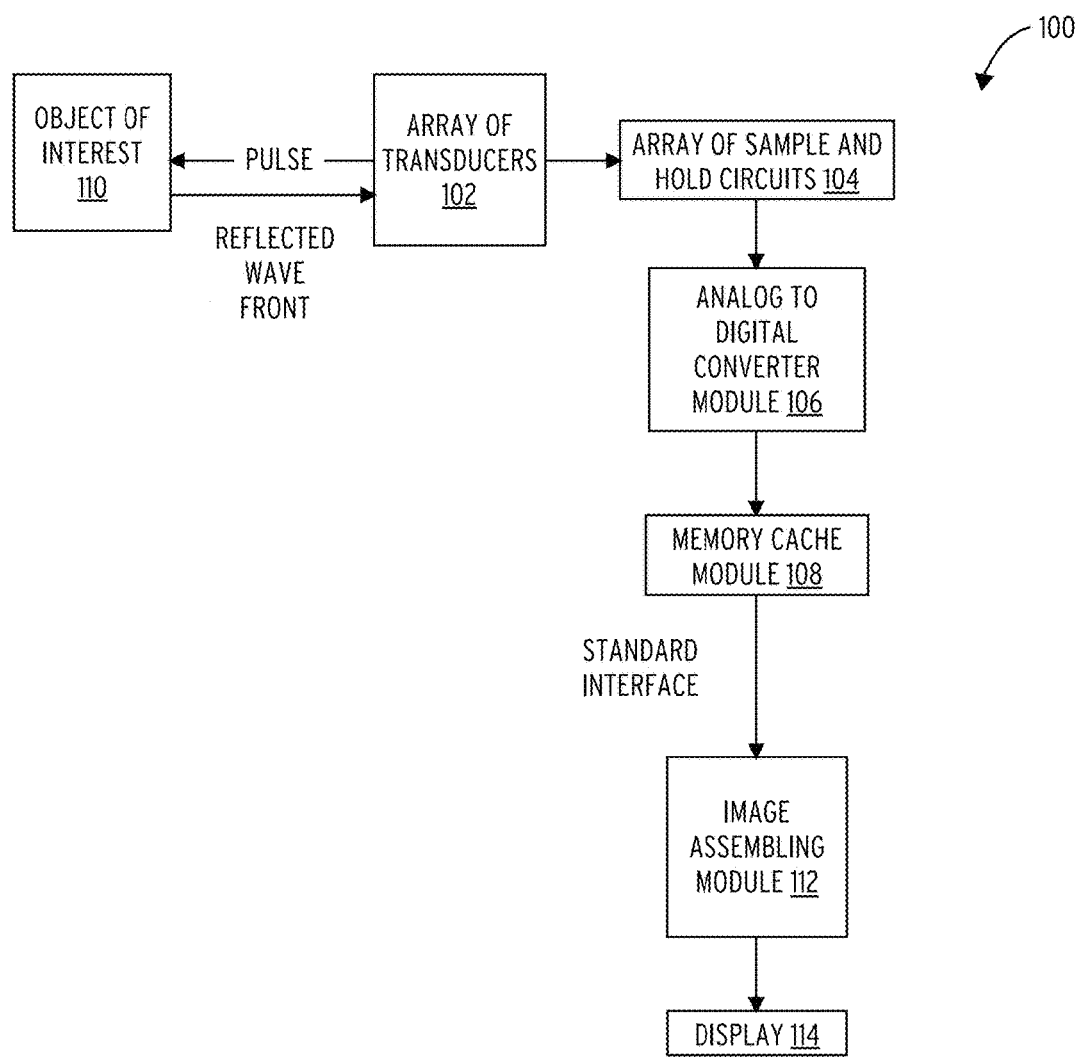
FIG. 1 illustrates an embodiment of a phased array data processing system.

"Attenuation rate" in this context refers to a measure of the rate at which the intensity of a pulse diminishes as it penetrates an object.

"Common system interface (CSI)" in this context refers to a variable width, point to point, packet-based interface implemented as two uni-directional links with low-voltage differential signaling.

"Large Scale Integration (LSI)" in this context refers to an integrated circuit with between 500 and 300000 components or more than 100 gates.

"Medium Scale Integration (MSI)" in this context refers to an integrated circuit with fewer than 500 components or more than 10 but less than 100 gates.

"Peripheral Component Interconnect (PCI)" in this context refers to a serial expansion bus standard for connecting a computer to one or more peripheral devices.

"Sample and Hold Circuit" in this context refers to an analog device that captures the voltage of a continuously varying analog signal and holds its value at a constant level for a specified period of time for digital conversion.

"Universal Serial Bus (USB)" in this context refers to a serial bus standard used for transferring data to and from digital devices.

"Very Large Scale Integration (VLSI)" in this context refers to microchips containing in the hundreds of thousands of transistors.

Described herein are systems and methods for processing and transferring data from a phased array to a computer processing unit (CPU) to produce frequency based images with a controlled loss of information. Further described are methods and systems for storing data from a phased array and transferring the data at a rate that can be processed by a standard computer interface.

The total digitized sensor data needed per displayed frame of processed data is about 32000 bits per acoustic pulse. Any standard computer interface protocol has a maximum speed at which data can be transmitted. The amount of data that needs to be transferred from a phased array is proportional to the number of transducers (XDCR) in the phased array times the sample rate ($f_s$) times the number of bytes of data per transducer per image frame. The rate at which the data is produced by a phased array may be computed as the number of XDCR*$f_s$*frequency (f)*the number of bytes of data per transducer per image frame. For example, an array of 2,000 transducers sampling a 5 MHz signal at four times the frequency of the signal would generate a peak data rate of 640 Gb/second, a rate which is 120 times faster than a USB3 interface can handle and 1024 times faster than a USB2 interface can handle. The total amount of data needed per displayed frame would therefore be 128 Mb (2000 XDCR*4 $f_s$*16 bits/sample) (assuming an analog to digital converter generating between about 8 to about 16, about 12 bits per sample or any fraction thereof). As the number of transducers and/or the frequency increases, the peak data rate increases as well. By fractionalizing the depth (as a function of time) of the imaged data received from a transducer according to the techniques described herein, image quality can be retained within set memory constraints. For example, using the attenuation coefficient $\alpha = \log_{10}(I_o/I_x)/2x$ where $I_x$ is the final intensity, $I_o$ is the initial intensity, and 2x is the medium layer thickness as determined by the time it takes for a pulse to travel and return, and where the attenuation coefficient increases with frequency, for 2000 transducers sampled 2000 times (500λ×4 samples per period, where 500λ is representative of the maximum amount of tissue a signal can penetrate and return from before the signal degrades to extinction) at 2 MHz, 8 MB of memory may be necessary to transmit the data over a standard interface. As the number of transducers and/or the sampling rate increases, the amount of memory required correspondingly increases. By fractionalizing the depth of signal penetration as a function of time into quantum blocks (Q-blocks), a smaller amount of memory may be utilized to capture a plurality of samples of data while maintaining the desired image quality.

In a phased array, a plurality of acoustic pulses (pulse) are communicated from a plurality of transducers in fractions of a second and the returning wave fronts are captured to rapidly create a series of image frames that can be displayed in real time. The pulses may be communicated from some or all of the transducers in the phased array at one time. In some embodiments, all of the transducers send a pulse at once. In other embodiments, groups of transducers in the phased array may send pulses at the same time. In some embodiments, the reflected wave front from a pulse may be time-shifted to compensate for varying delays based on the position of the transducer relative to other transducers pulsing at the same time. Each set of pulses from a phased array may be sent at the same or one or more different frequencies. In some embodiments, each set of pulses from the phased array are the same frequency. For example, a first pulse may be communicated at one frequency. A subsequent pulse may be communicated at a different frequency. In some embodiments, such differences in frequency may be optimized to allow for the capture of the highest quality image at a particular depth. Samples of the returning wave front may be captured at a plurality of time fractions (Q-block) from which the depth of penetration of the signal may be calculated. In some embodiments, the Q-blocks are contiguous. In other embodiments, the Q-blocks may overlap by about 0% to about 50% with the preceding or subsequent Q-block. In additional embodiments, portions of returning wave fronts along the edges of a focal width of a Q-block may be captured at a later time point than portions of returning wave fronts in the middle of a Q-block. Such Q-blocks may be represented as having varying degrees of concavities allowing for the difference in wave capture time.

A pulse communicated by a transducer is reflected back to the transducer after striking a reflector such as a change in acoustic impedance. The transducer receives the returning echoes and captures fractions, based on the sampling rate of analog-to-digital converters of at least 2 times to about 4 times, about 6 times, about 7 times, about 10 times, the fundamental acoustic pulse frequency or any subset thereof. The echoes are converted to samples by the analog to digital converter in the transducer which generates a specific number of bits of data per sample, for example 12 bits/sample. A plurality of sample data from within a first time fraction of the echo forms a quantum block (Q-block) of the data. Each sample of data (data captured from a specific moment in time) from each transducer is sent to a buffer dedicated to that transducer, and the processed data from fractions of fractions (sampling of Q-blocks) is collected into one coherent Q-block which is then transmitted to a central processing unit. Once the echoes from a first pulse have sufficiently attenuated, a second pulse is generated from the transducers and samples from a second Q-block of time of the echo are buffered. The echoes are allowed to attenuate and a third pulse is generated from the transducers and samples from a third time fraction of the echo are buffered. The echoes are allowed to die and a pulse is generated n times until the time fraction of the captured echo in an nth Q block reaches maximum attenuation or amplitude decay. In some embodiments, each Q-block may capture an independent depth as a function of time so that each Q-block is from an adjacent depth as represented by a consecutive lengths of time (t) during which a pulse is communicated and an echo returns. In other embodiments, one or more Q-blocks may overlap in the same or different amounts of depth increasing the likelihood that an object of interest may be fully imaged in a single Q-block maintaining phase coherence and therefore increasing image quality. In additional embodiments, Q-blocks may overlap more at the edges and corners and less in the middle curving the upper and lower edges of a Q-block and maximizing the quality of the final image while still restricting the amount of memory needed in the buffer. Q-blocks may overlap by about 0% to about 50% or any fraction thereof with the previous and/or subsequent Q-block.

While the fractions of time making up each Q-block may be any amount of time desired, each fraction may be small enough to implement locally to the front end circuitry and large enough for coherent signal analysis such that there is coherent data from all transducers in a given reflected wave front and the Q-blocks can be reassembled into a consistent image after processing. In some embodiments the fraction may be at least about four times the analog to digital sample times (where depth is measured in relation to time) to a maximum of the entire image volume of a single q-block.

The data from each Q-block is transmitted at a rate greater than the peak data generation rate to a buffer in which each transducer has dedicated memory. The size of the buffer in the memory cache may be the same or different for each transducer. In some embodiments, the size of the buffer may be larger for transducers located on the edges of the phased array. In some embodiments, the buffer transmits the data from the first time fraction through a standard interface to a central processing unit. While the data from the first time fraction is being transferred, the digital signal from a second or subsequent time fraction fills the buffer. In some embodiments, each subsequent time fraction fills the buffer as the prior time fraction is transferred to a central processing unit. The central processing unit then assembles the Q-blocks of time into a single image frame. In some embodiments, the central processing unit waits until all time fractions have been received. In other embodiments, the central processing unit assembles the time fractions as they are received. In additional embodiments, the central processing unit assembles the Q-blocks for a previous image frame while receiving a digital signal for a subsequent image frame. If the Q-blocks overlap, the image may be averaged as images are not restricted to phase coherence. The process is repeated for each frame, beginning again with a first Q-block.

Images from a phased array are created by interpreting the intensity of the reflected echoes. In order to distinguish between different objects, different objects must have different resistances to sound (acoustic impedance) (Z) where Z=density×velocity. As sound passes through tissue, each tissue attenuates the sound at a different rate. Attenuation increases with depth and the higher the frequency of the pulse, the more rapidly a signal will attenuate. However, the higher the frequency of the pulse, the better the image quality. In some embodiments, the frequency of the pulse may be altered between subsequent pulses to obtain the best image for each depth captured by a Q-block of time.

When a wave passes from one type of tissue to another, the frequency is constant, but because the velocity changes (velocity (v)=wavelength (λ)×frequency (f)), the wavelength also changes. By comparing the attenuation length to the wavelength, the maximum frequency at which ultrasound can coherently propagate in a statistical fluid can be estimated. Every material has an attenuation coefficient, a quantity that characterizes how easily a material can be penetrated by energy. The attenuation coefficient can be defined as $\alpha=20 \log_{10}(e)(\mu_A) \approx 8.7 \mu_A$ where $\mu_A$ is the amplitude attenuation factor in $cm^{-1}$ and e is Napier's constant (about 2.71828). Attenuation is determined by $\alpha[dB/(MHz*cm)]*$total distance traveled$[cm]*f[MHz]$. Attenuation may also be quantified as a measure of the distance a pulse travels before its amplitude is attenuated to ½ its original value. Typical values for the attenuation coefficient in the human body are about: fat 0.6 dB/cm*MHz, liver 0.5-0.94, kidney 1.0 dB/cm*MHz, muscle 1.3-3.3 dB/cm*MHz, bone 20 dB/cm*MHz and air 12 dB/cm*MHz resulting in average sound speeds in meters (m)/second (s) of 1540 m/s in soft tissue, 1459 m/s in fat, 1570 m/s in blood and 4080 m/s in bone (Feigenbaum's Echocardiography, 6th Edition, 2005, Lippincott Williams & Wilkins). Attenuation may additionally be caused by the angle of a returning wave front. Such an attenuation is proportional to the cosine of the angle of the wave front to normal. For example, a wave reflected at a 45° angle may lose 3 dB in amplitude in addition to any tissue attenuation.

The depth to which a pulse can usefully penetrate can be calculated by d=(v×time (t))/2, where time is the time it takes for a pulse to travel from a transducer to the reflection point and then from the reflection point back to the transducer. For example for soft tissue, a pulse intersecting with an object of interest at a depth of 1 cm would return a wave front in 13μ seconds. Maximum useful depth can also be calculated as (amplitude of signal)/(2*(frequency)) in centimeters. For example, with a standard transducer amplitude of ~65 dB, a frequency of 2.5 MHz would penetrate about 13 centimeters, appropriate for imaging the deep abdomen, whereas a frequency of 10 MHz would penetrate only about 3.25 cm, appropriate for imaging the breast, thyroid, superficial veins or masses. The higher the frequency, the greater the image resolution and the greater the rate and amount of data produced per unit of time.

Referring to FIG. 1, an array of transducers 102 generates pulses and receives a reflected returning wave front shaped by the presence of an object of interest 110. The array of sample and hold circuits 104 captures the received raw data for a sample taken from a specific span of time (a quantum block or Q-block). The raw data is then converted to a digital signal using the analog to digital converter module 106 which comprises an analog front end for each input sensor (or transducer) comprising amplifiers and analog-to-digital converters with high bandwidth on-die termination and stored in memory cache module 108 for digitized data. The front end circuitry may be a VLSI, LSI, MSI, CSI, or other similar integrated circuit which is designed to receive and process the transducer response to the reflected wave front at a rate greater than the maximum data rate of the data interface front-back or back end. For example, an array of ultrasound transducers may be connected to a VLSI chip which contains the front end circuitry. This front end may produce a peak data rate of up to 300 million two-byte data samples per transducer per second or greater which exceeds the 640 MBps transfer rate of current interfaces such as a USB3 interface.

Each transducer has dedicated memory in memory cache module 108. The size of the dedicated memory corresponds to the amount of memory that will hold the desired number of signal samples generated over a specified amount of time, e.g., if a signal received from a transducer is sampled 100 times per microsecond, the transducer would have dedicated memory sufficient to hold the data from 500 samples or more. In some embodiments, the amount of memory per transducer is constant for a given image quality. The digital signal is transmitted from the memory cache module 108 via a standard interface protocol to the image assembling module 112 where signals from a plurality of Q-blocks corresponding to the penetration depth of a pulse are assembled into a single image frame. The reassembled image is then transmitted to a display 114 for viewing.

Figure 2:
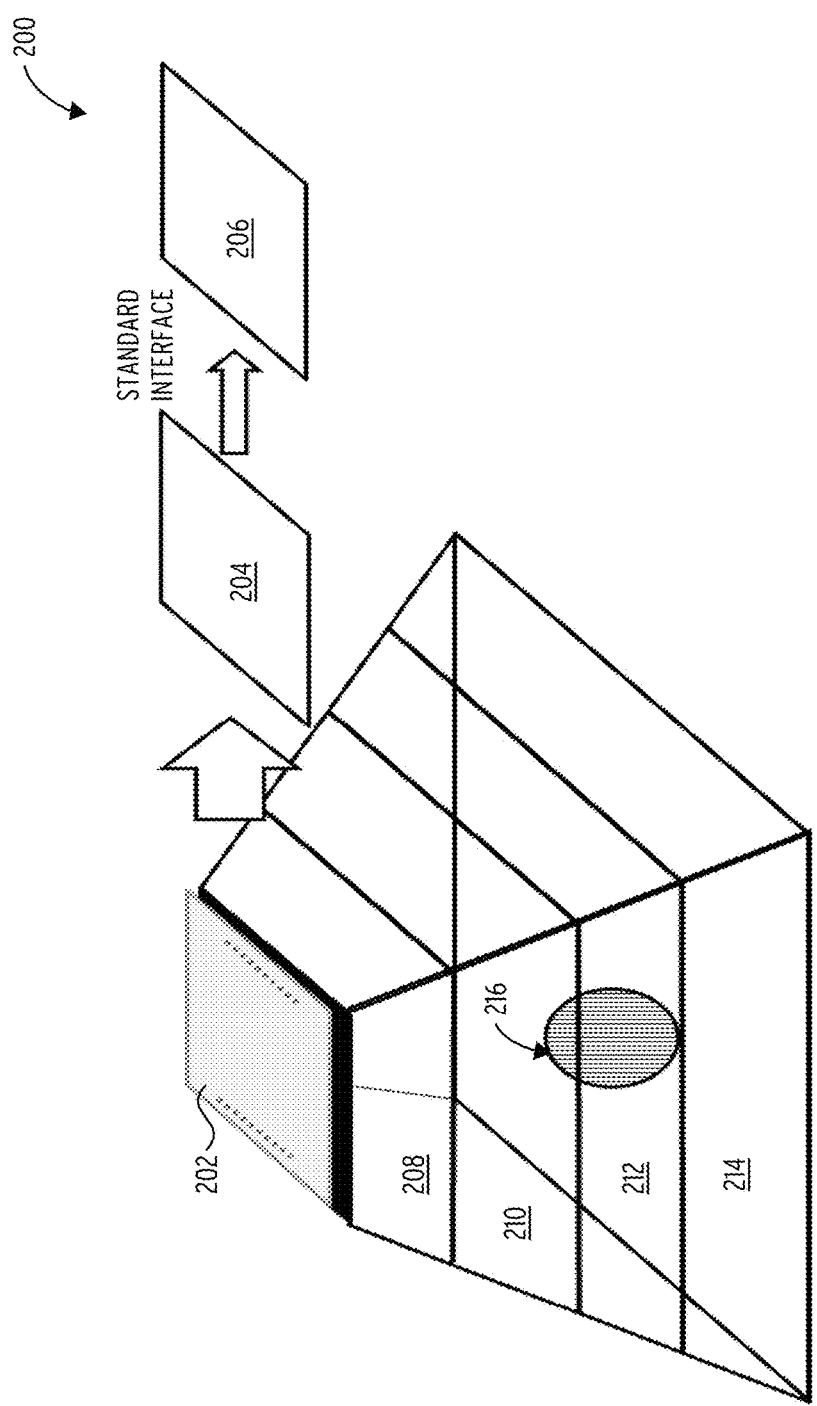
FIG. 2 illustrates an embodiment of processing of signals from a phased array.

FIG. 2 illustrates a method of image processing that reduces the amount of memory utilized to process the data received from a plurality of transducers in a phased array while maintaining a desired image quality. A phased array 202 may receive data from a depth of nth Q-block 214 where nth Q-block 214 represents the maximum useful depth which a pulse of specific frequency will penetrate. Each of a first Q-block 208, a second Q-block 210, Q-block . . . 212 and nth Q-block 214 represents a particular depth as determined by the length of time in microseconds it takes for a pulse to be generated by the phased array 202 and a wavefront to return. The memory cache 204 receives a transducer response, samples taken at one quantum block in depth (as measured in time) which a been converted to a digital signal. The digital signal is transferred at a high rate from each transducer in the array into the dedicated memory for each transducer.

The dedicated memory receives the plurality of samples of returning wavefronts from a first depth of a first Q-block 208. The dedicated memory buffers the plurality of samples of the returned wavefront from a first depth of a first Q-block 208 measured by a first span of time and transmits the data to the central processing unit at a rate compatible with the data communication capabilities of a standard interface. When the echoes from the returning wavefront of a first depth of a first Q-block 208 have sufficiently attenuated, a second pulse is generated from transducers in the phased array 202. The first span of time including the echoes of a first depth, represented by a first Q-block 208, are ignored and a plurality of samples of echoes from a second span of time penetrating a second depth of a second Q-block 210, shaped by the object of interest 216 are received in the dedicated memory. While the echoes from a second Q-block 210 are received into the buffer in the memory cache 204, the memory cache 204 is transmitting the processed data from a first Q-block 208, emptying the buffer according to any type of queuing technique generally used including, but not limited to, first-in-first-out (FIFO), serial-in-parallel-out (SIPO), parallel-in-serial-out (PISO) or chunking. When the echoes of a second Q-block 210 have sufficiently attenuated, another pulse is generated from transducers in the phased array 202. The first span of time including the echoes of a first depth, represented by a first Q-block 208, and the second span of time including the echoes of a second depth, represented by a second Q-block 210, are ignored and samples of echoes from a third span of time penetrating a third depth Q-block . . . 212, shaped by the object of interest 216 are received in the dedicated memory. While the echoes from Q-block . . . 212 are received into the buffer in the memory cache 204, the memory cache 204 is transmitting the processed data from a second Q-block 210, emptying the buffer according to the preferred queuing technique. Pulses from the phased array 202 are generated n times with the echoes from the previous spans of time ignored while data from each subsequent period of time are received and buffered in the memory cache 204. While the data from a subsequent period of time is being received into the buffer, the processed data from the previous period of time is transmitted to the central processing unit 206 at a rate compatible with the data communication capabilities of a standard interface. Each Q-block is sufficiently large to maintain phase coherence. The central processing unit 206 assembles the Q-blocks into an image frame. The entire process is then repeated beginning with a first pulse generated from the phased array 202 and the dedicated memory receiving samples of echoes of a first depth of a first Q-block 208 and continuing through nth Q-block 214 until the desired number of image frames are captured.

Figure 3:
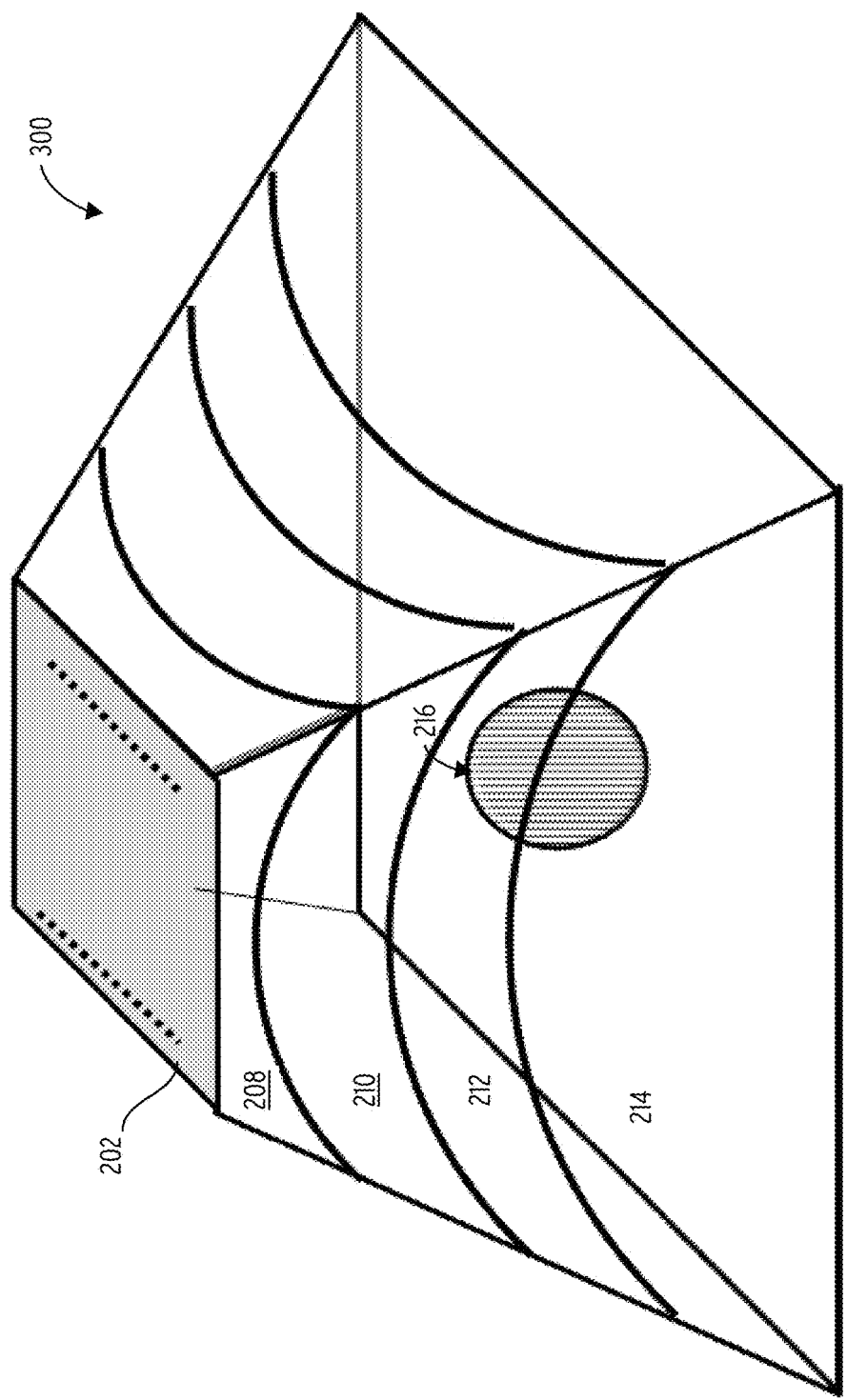
FIG. 3 illustrates an embodiment in which data from the edges of a focal depth are captured at a later time then the data from the center of a focal depth.

FIG. 3 illustrates an embodiment of data capture in which the edges of a focal depth are captured at a later time then the data from the center of the focal depth. A phased array 202 may receive data from a depth of nth Q-block 214 where nth Q-block 214 represents the maximum useful depth which a pulse of specific frequency will penetrate. Each of a first Q-block 208, a second Q-block 210, Q-block . . . 212 and nth Q-block 214 represents a particular depth as determined by the length of time in microseconds it takes for a pulse to be generated by the phased array 202 and a wavefront to return. The particular portion of the total depth as defined by each Q-block may be the same or different within the Q-block. For example, as shown in FIG. 3, the depth at the edge of each Q-block is collected at a later point of time then the depth of the center of each Q-block. The degree of concavity of each Q-block may be determined based on the type of imaging being performed and/or the expected location of an object of interest. In some embodiments, the Q-blocks may be rhomboid, hyperbolic, flat, slanted, spherical or varying degrees of concavity.

Figure 4:
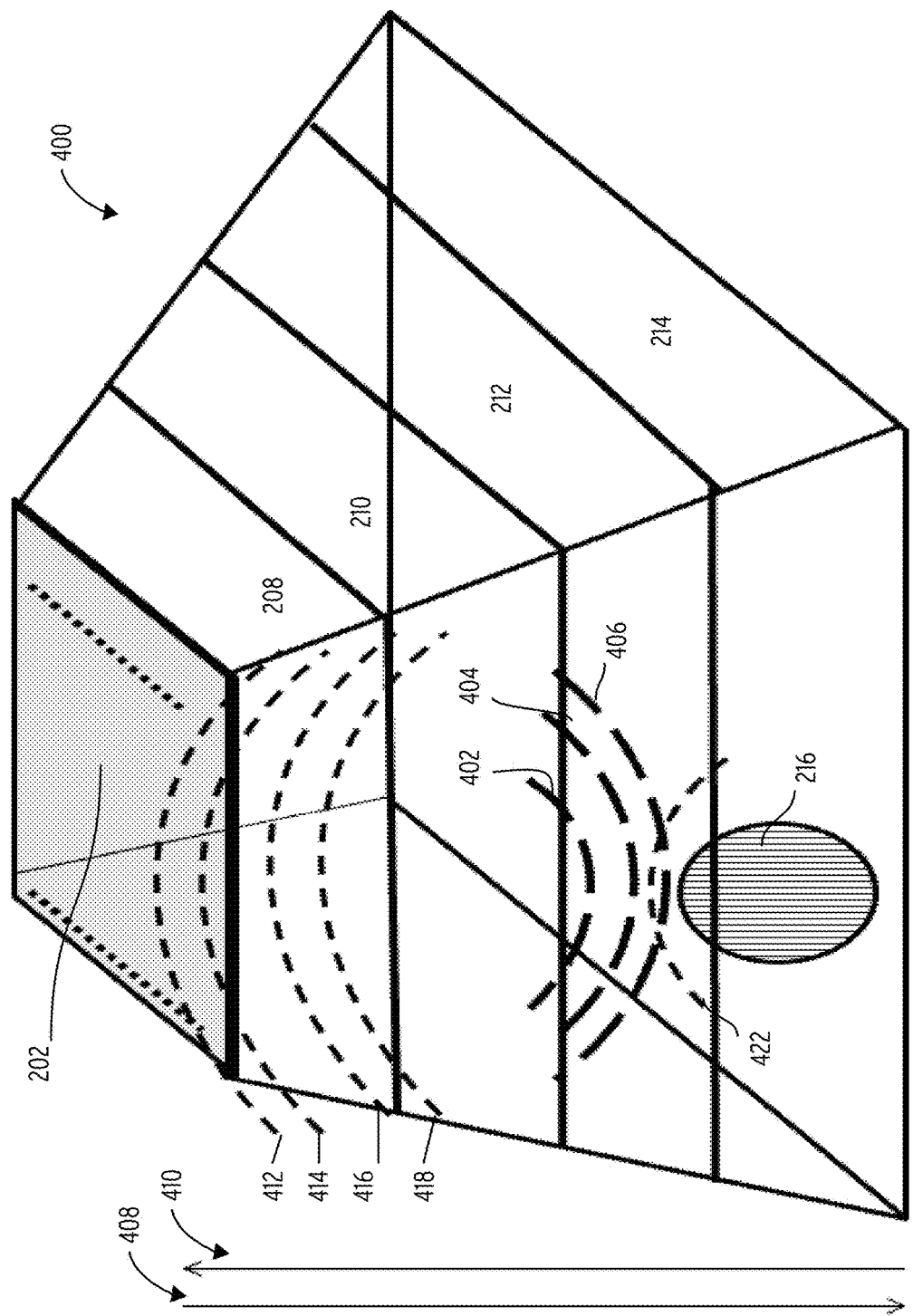
FIG. 4 illustrates an aspect of wave propagation from a phased array.

Referring to FIG. 4, a pulse of specific duration is communicated from a phased array 202. The pulse duration equals the (number of cycles)/frequency and generates transmitted wave fronts 402, 404 and 406. A time (t) for the pulse to travel 408 and return 410 may be used to calculate penetration depth d=(v×time (t))/2 where time is the time it takes for a pulse to travel from a transducer to the reflection point and then from the reflection point back to the transducer. Samples from a Q-block of time are transferred to a buffer, where each Q-block captures a portion of returning wave fronts respectively at times $t_m$ where m is the number of samples taken by the analog to digital converter in each Q-block. The portion of the returning wave front captured is determined by the position of the returning wave fronts 412, 414, 416, 418 and 422 during a Q-block of time. For example, the very ends of returning wave fronts 412 and 414 would be captured in samples taken during a first Q-block 208. Portions of returning wave fronts 416, and 418 would also be captured in samples taken during a first Q-block 208. A portion of returning wave front 418 would additionally be captured by samples taken during a second Q-block 210 at a second Q-block of time, wherein each Q-block of time is consecutive to the prior Q-block of time. Samples of returning wave front 402 are captured in Q-block . . . 212 which is a period of time consecutive and subsequent to the prior Q-block. Phase coherence is maintained by the portion of each returning wave front captured in a single Q-block. Therefore, portions of returning wave fronts 412, 414, 416, and 418 would have phase coherence in a first Q-block 208. In some embodiments, each Q-block of time may overlap with the prior and/or subsequent Q-block of time from about 0% to about 50% or any fraction thereof to increase the amount of phase coherence for each set of waves and increase the likelihood that an object of interest will be captured within a single Q-block, increasing the quality of the final image. In some embodiments, such overlapping images may then be averaged to produce the final image.

Figure 5:
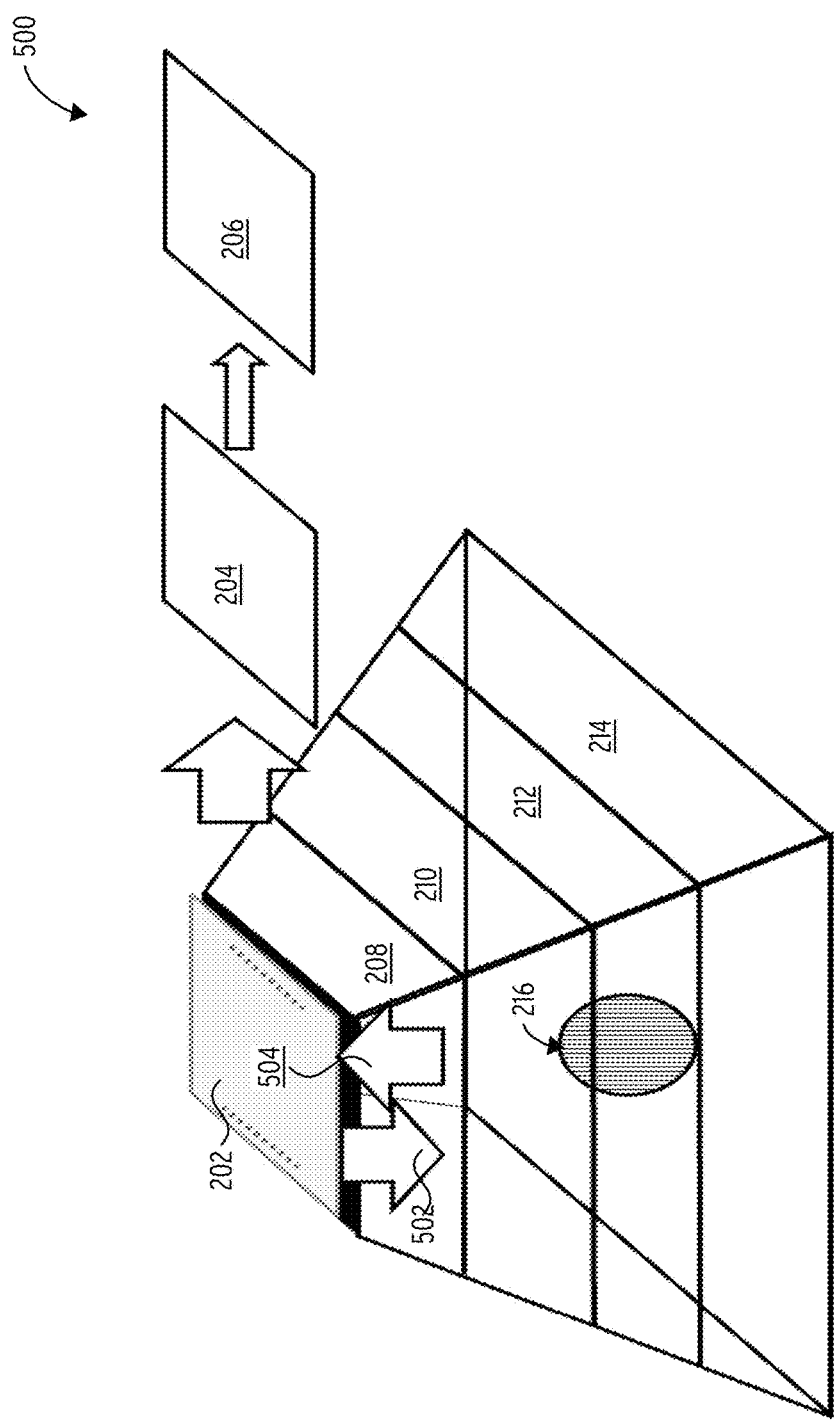
FIG. 5 illustrates the processing of data received from a first pulse communicated by a phased array over a first time frame.

As shown in FIG. 5, the phased array 202 sends a pulse 502 and receives an echo 504 from a depth of a first Q-block 208 and is sampled at the sample rate. The memory cache 204 receives the transducer response comprising the samples from the depth of the first Q-block 208, where each quantum block captures data from pre-determined spans of time which penetrate the object being scanned at a specific wavelength to a specific depth. The transducer response is received at a high rate from each transducer in the array into the dedicated memory for each transducer. The dedicated memory receives the samples of the echoes of a first depth of a first Q-block 208 which in FIG. 5 does not contain an object of interest 216. The dedicated memory buffers the samples of the echoes of a first depth of a first Q-block 208 measured by a first span of time, collects the samples into a first Q-block and transmits the data to the central processing unit at a rate compatible with the data communication capabilities of a standard interface. Phase coherence is maintained in the Q-block and the central processing unit 206 holds the data from a first Q-block 208 to be assembled with subsequent Q-blocks into an image frame.

Figure 6:
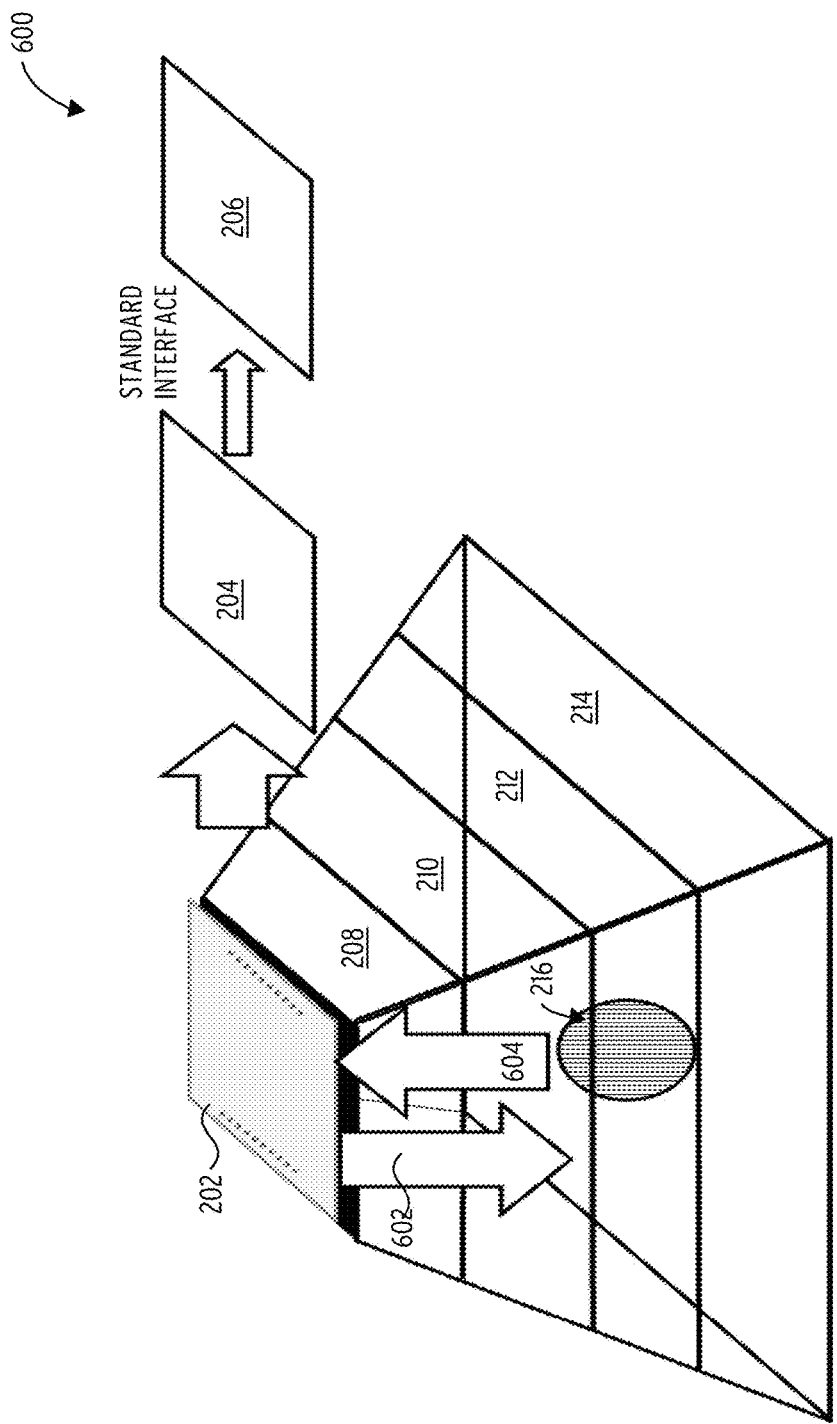
FIG. 6 illustrates the processing of data received from a second pulse communicated by a phased array over a second time frame into an image containing an object of interest.

As shown in FIG. 6, the phased array 202 sends a second pulse 602 after the echoes from the first pulse 502 have sufficiently attenuated. The first span of time including the echoes from the first depth represented by a first Q-block 208 are ignored and samples from echo 604 from the second span of time penetrating a second depth of a second Q-block 210, shaped by the object of interest 216 are received in the dedicated memory in memory cache 204. While the echoes from a second Q-block 210 are received into the buffer in the memory cache 204, the memory cache 204 is transmitting the processed data from a first Q-block 208, emptying the buffer according to any type of queuing technique generally used including, but not limited to, first-in-first-out (FIFO), serial-in-parallel-out (SIPO), parallel-in-serial-out (PISO) or chunking at a rate compatible with the data communication capabilities of the central processing unit 206. In some embodiments, the central processing unit 206 waits until all Q-blocks of data are received to assemble an image frame. In further embodiments, the Q-blocks from a prior image frame are assembled by the central processing unit 206 as the central processing unit 206 is receiving Q-blocks of data for a subsequent image frame.

Figure 7:
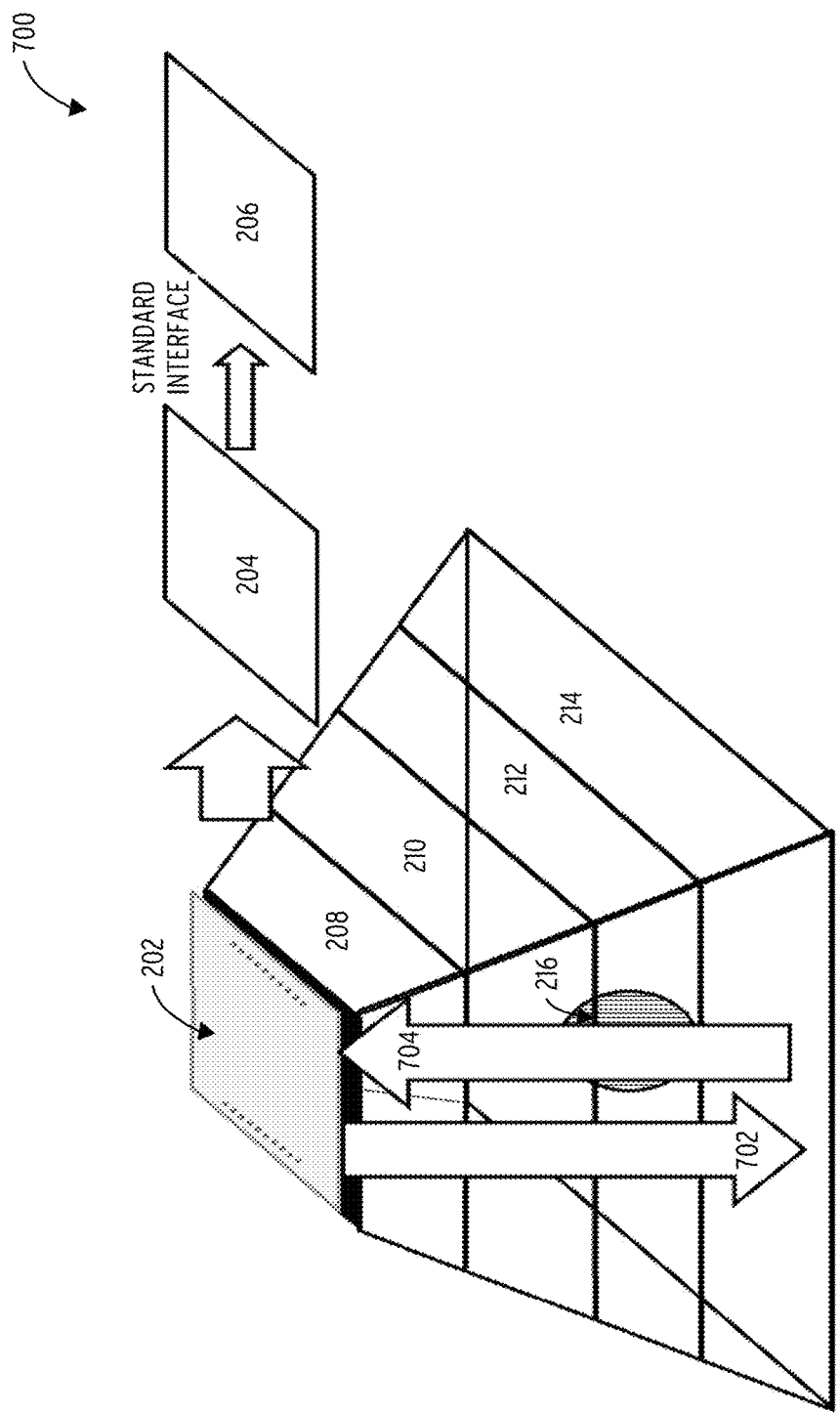
FIG. 7 illustrates the processing of data received from additional pulses communicated by a phased array over n periods of time into an image containing an object of interest.

As shown in FIG. 7, when the echoes of the prior pulse have sufficiently attenuated, another pulse 702 is generated from transducers in the phased array 202. The first span of time including the echoes of a first depth, represented by a first Q-block 208, the second span of time including the echoes of a second depth, represented by a second Q-block 210, and subsequent spans of time represented by Q-block . . . 212 are ignored and samples of echoes 704 from an additional span of time penetrating an additional depth of nth Q-block 214 are received in the dedicated memory. While the echoes 704 from nth Q-block 214 are received into the buffer in the memory cache 204, the memory cache 204 is transmitting the processed data from Q-block . . . 212, emptying the buffer according to any type of queuing technique generally used including, but not limited to, first-in-first-out (FIFO), serial-in-parallel-out (SIPO), parallel-in-serial-out (PISO) or chunking. Pulses from the phased array 202 are generated n times with the echoes from the previous spans of time ignored while data from each subsequent period of time are received and buffered in the memory cache 204. The memory cache 204 then transfers processed data from the previous period of time to the central processing unit 206 at a rate compatible with the data communication capabilities of a standard interface. The entire process is then repeated beginning with a first pulse generated from the phased array 202 and the dedicated memory receiving echoes of a first depth of a first Q-block 208 and continuing through nth Q-block 214 at the maximum penetration depth for a given frequency until the desired number of image frames are captured.

Figure 8:
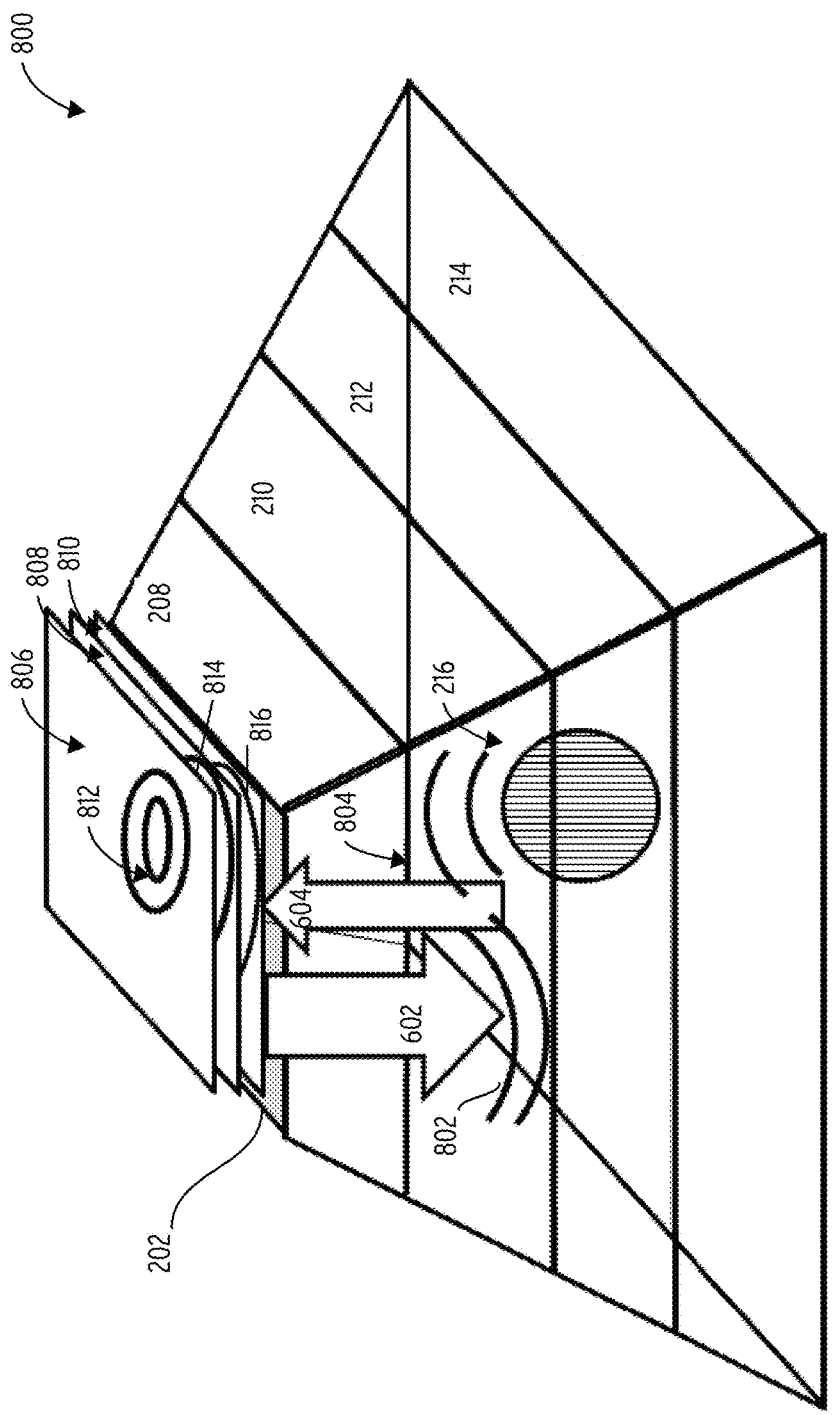
FIG. 8 illustrates the projection of a returning wave onto an array from a pulse communicated from the phased array as altered by an object of interest.

Referring to FIG. 8, a projections of a returning wave on an array for a plurality of samples in a given Q-block is shown. A phased array 202 sends a second pulse 602 which has a pulse wave front 802. The first span of time including the echoes of a first depth, represented by a first Q-block 208, are ignored and echoes (returning wave front 804) from a second span of time penetrating a second depth of a second Q-block 210, shaped by the object of interest 216 are received. While samples of the echoes from a second Q-block 210 are received into the buffer in the memory cache 204, the memory cache 204 is transmitting the processed data from a first Q-block 208, emptying the buffer according to any type of queuing technique generally used including, but not limited to, first-in-first-out (FIFO), serial-in-parallel-out (SIPO), parallel-in-serial-out (PISO) or chunking. Pulses from the phased array 202 are generated n times with the echoes from the previous spans of time ignored while data from each subsequent period of time are received and buffered in the memory cache 204 while the processed data from the previous period of time is transmitted by the memory cache 204 to the central processing unit 206 at a rate compatible with the data communication capabilities of a standard interface. Each Q-block creates an image of a particular depth as shown in the collection of samples represent by the projection of returned wave on array for a single sample 806, projection of returned wave on array for a single sample 808, and projection of returned wave on array for a single sample 810. Each sample from a particular Q-block in depth contains the part of the object of interest 216 at that depth as shown at projection of returning wave front intersecting with object of interest 812, projection of returning wave front intersecting with object of interest 814, projection of returning wave front intersecting with object of interest 816. The images from each Q-block (projection of returned wave on array for a single sample 806, projection of returned wave on array for a single sample 808, and projection of returned wave on array for a single sample 810, as an example) are then assembled by the central processing unit 206 to create an image frame. The entire process is then repeated beginning with a first pulse generated from the phased array 202 and the dedicated memory receiving samples of echoes of a first depth of a first Q-block 208 and continuing through nth Q-block 214 until the desired number of image frames are captured.

Figure 9:
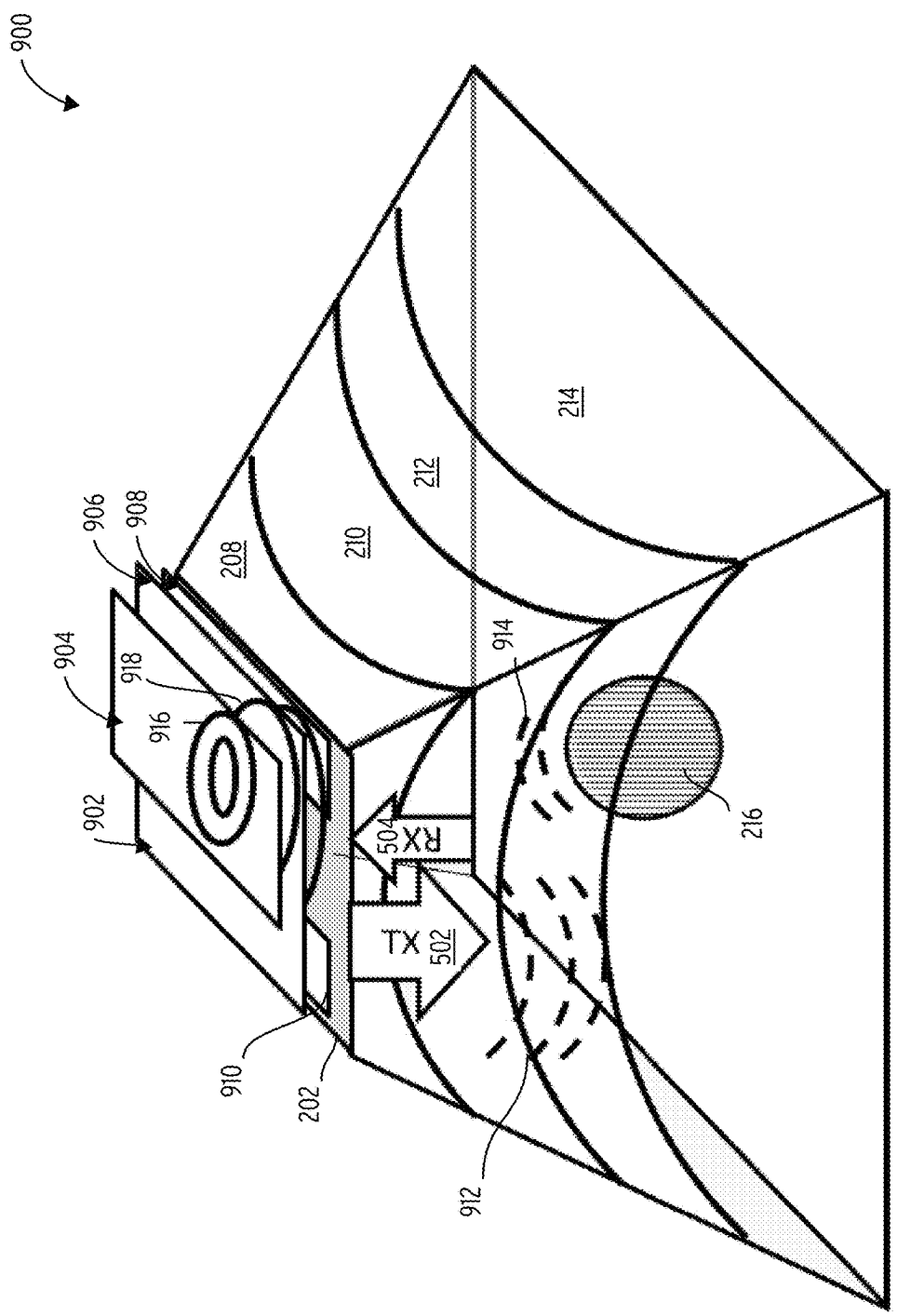
FIG. 9 illustrates the projection of a returning wave onto an array from a pulse communicated from the phased array and altered by an object of interest, where the returning wave front from the edges of a focal depth are captured at a later time then the returning wave front from the center of a focal depth.

Referring to FIG. 9, a projection of a returning wave on an array for a given Q-block is shown. A phased array 202 sends a second pulse 502 which has a pulse wave front 912. The first span of time including the echoes of a first depth, represented by a first Q-block 208, are ignored and echoes (returning wave front 914) from a second span of time penetrating a second depth of a second Q-block 210, shaped by the object of interest 216 are received. While the samples of the echoes from a second Q-block 210 are received into the buffer in the memory cache 204, the memory cache 204 is transmitting the processed data from a first Q-block 208, emptying the buffer. When the echoes of the second pulse have sufficiently attenuated, another pulse is generated from transducers in the phased array 202. The first span of time including the echoes of a first depth, represented by a first Q-block 208, and the second span of time including the echoes of a second depth, represented by a second Q-block 210, are ignored and samples of the echoes from a third span of time penetrating a third depth Q-block . . . 212, shaped by the object of interest 216 are received in the dedicated memory. While the samples of the echoes from Q-block . . . 212 are received into the buffer in the memory cache 204, memory cache 204 is transmitting the processed data from a second Q-block 210, emptying the buffer according to any type of queuing technique generally used including, but not limited to, first-in-first-out (FIFO), serial-in-parallel-out (SIPO), parallel-in-serial-out (PISO) or chunking. Pulses from the phased array 202 are generated n times with the echoes from the previous spans of time ignored while data from each subsequent period of time are received and buffered in the memory cache 204 while the processed data from the previous period of time is transmitted by the memory cache 204 to the central processing unit 206 at a rate compatible with the data communication capabilities of a standard interface. Each sample captured from a Q-block shows a change in acoustic impedance at a particular depth as shown in projection of a returning wave front on an array from a single sample 902, projection on array of returning wave front from a single sample of time 904, projection of returning wave front on array from a single time sample 908, and projection of a returning wave front on an array from a single sample 910. Each image of a particular depth contains the part of the object of interest 216 at that depth as shown at projection of returning wave front 916 and projection of returning wave front 918. After buffering, the images collected from each sample taken within a Q-block (projection of returning wave front 916 and projection of returning wave front 918 as an example) are collected and transmitted to the central processing unit 206 to be assembled with other Q-blocks to form an image frame. The entire process is then repeated beginning with a first pulse generated from the phased array 202 and the dedicated memory receiving echoes of a first depth of a first Q-block 208 and continuing through nth Q-block 214 until the desired number of image frames are captured.

Figure 10:
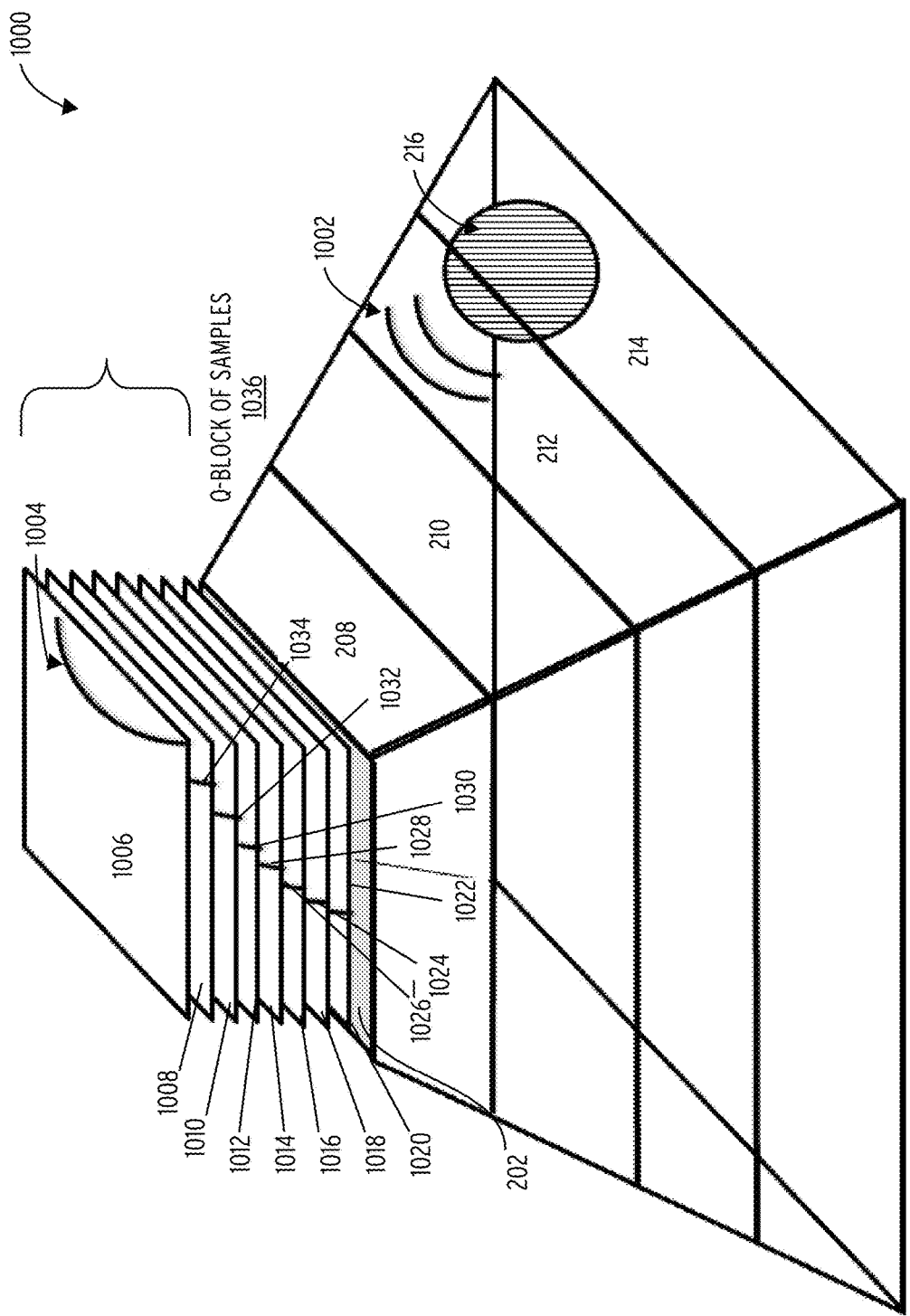
FIG. 10 illustrates the projection of a returning wave onto an array from a pulse communicated from the phased array and altered by an object of interest.

Referring to FIG. 10, a pulse is sent from the phased array 202. The first span of time including the echoes of a first depth represented by a first Q-block 208 are ignored, the second span of time including echoes for a second depth represented by a second Q-block 210 are ignored and echoes (returning wave front 1002) from a third span of time penetrating a subsequent depth represented by a subsequent Q-block . . . 212 shaped by the object of interest 216, are received. While samples of the echoes from Q-block . . . 212 are received into the buffer in the memory cache 204, the memory cache 204 is transmitting the processed data from a second Q-block 210, emptying the buffer according to any type of queuing technique generally used including, but not limited to, first-in-first-out (FIFO), serial-in-parallel-out (SIPO), parallel-in-serial-out (PISO) or chunking. Pulses from the phased array 202 are generated n times with the echoes from the previous spans of time ignored while data from each subsequent period of time are received and buffered in the memory cache 204 while the processed data from the previous period of time are transmitted to the central processing unit 206 at a rate compatible with the data communication capabilities of a standard interface. Each sample is captured at a different time in a Q-block of time and captures a change in acoustic impedance at the particular depth of that sample as shown in the projection of returned wave on array for a single q-block 1006, projection of returned wave on array for a single sample 1008, projection of returned wave on array for a single sample 1010, projection of returned wave on array for a single sample 1012, projection of returned wave on array for a single sample 1014, projection of returned wave on array for a single sample 1016, projection of returned wave on array for a single sample 1018, and projection of returned wave on array for a single sample 1020. Each sample of a particular depth contains the change in acoustic impedance from the intersection with the object of interest 216 at that depth as shown at projection of returning wave front intersecting with object of interest 1022 projection of returning wave front intersecting with object of interest 1024, projection of returning wave front intersecting with object of interest 1026, projection of returning wave front intersecting with object of interest 1028, projection of returning wave front intersecting with object of interest 1030, projection of returning wave front intersecting with object of interest 1032, projection of returning wave front intersecting with object of interest 1034 respectively. After buffering, the samples containing the images are collected into a Q-block of samples 1036 and then transmitted to the central processing unit 206 to be joined with other Q-blocks into an image frame. The entire process is then repeated beginning with a first pulse generated from the phased array 202 and the dedicated memory receiving echoes of a first depth of a first Q-block 208 and continuing through nth Q-block 214 until the desired number of image frames are captured. As shown in FIG. 10, when the location of the object of interest is unknown, for example in a diagnostic ultrasound, the entire view of the object of interest 216 may not appear in the image, requiring additional scans with a relocation of the phased array 202. In some embodiments, a diagnostic ultrasound or other frequency based imaging process where the location of an object is unknown, a scan may begin at a lower frequency to identify the presence of an object of interest. Once an object of interest is detected, a scan may be set at an optimal frequency for the depth of the object of interest.

Figure 11:
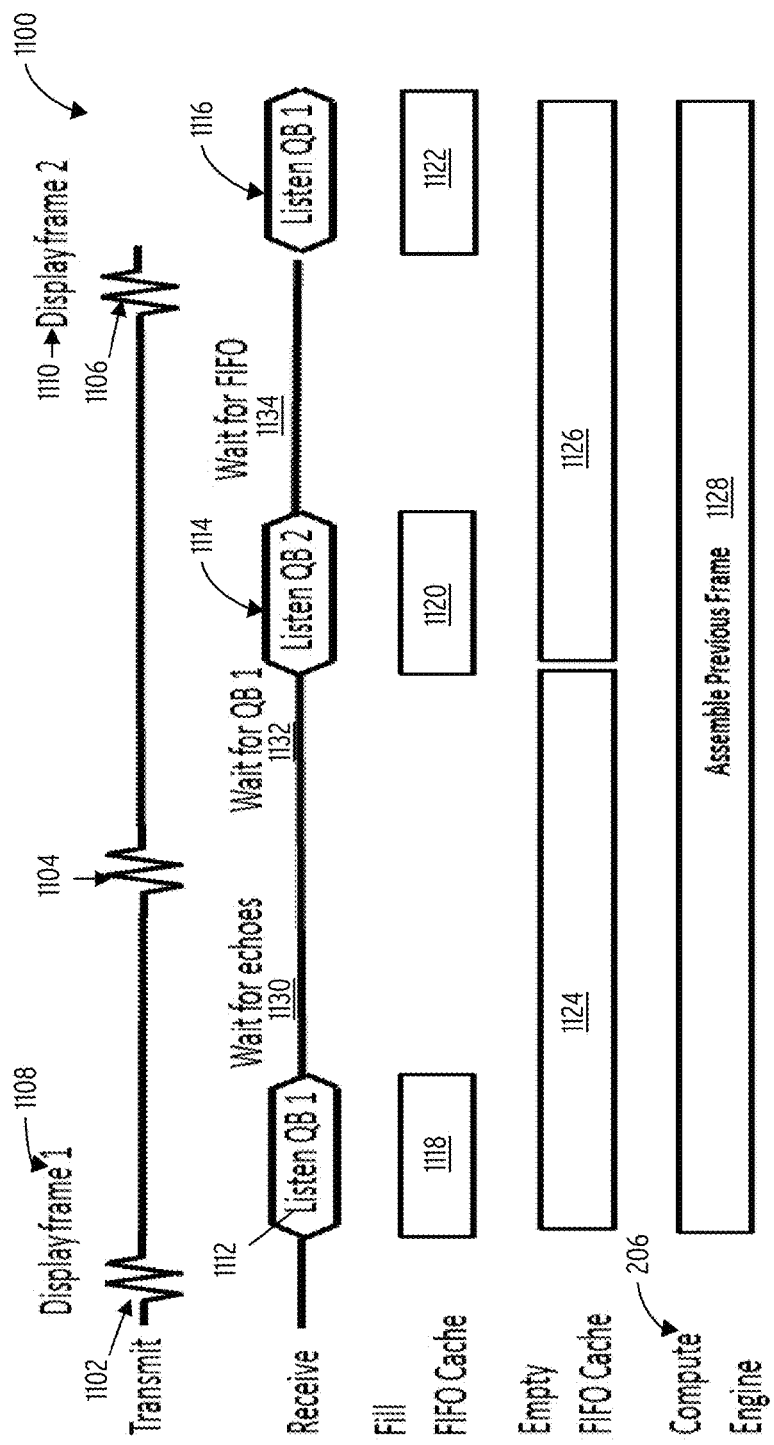
FIG. 11 illustrates a timing diagram for the sending of a pulse, the return of a wave front from a q-block, and the processing of returning wave fronts front from a series of q-blocks to form image frames.

Referring to the timing diagram in FIG. 11, to create a first image frame 1108, a first pulse 1102 is transmitted by a transducer. The returning wave front for a first Q-block (QB1) is received by the transducer at 1112 and a plurality of samples is transmitted at a high rate of transfer to a buffer in the memory cache at 1118. Once processed, the buffer is emptied as the data is transferred to central processing unit 206. When the echoes from the first pulse 1102 have sufficiently attenuated, a second pulse 1104 is communicated. The returning wave front for the time represented by QB1 is ignored 1132 and the returning wave front for the time represented by a second Q-block (QB2) is received by the transducer at 1114 and a plurality of samples captured in QB2 are transmitted at a high rate of transfer to the buffer in the memory cache at 1120. The buffer is emptied at 1126 and the data is communicated to the central processing unit 206. When all of the Q-blocks for a frame are collected and the buffer for that frame is emptied at 1134, a pulse 1106 is generated for the next image frame. The returning wave front for QB1 for the second frame is received by the transducer at 1116 and transmitted at a high rate of speed to a buffer in the memory cache at 1122. Once processed, the buffer is emptied and the data is transferred through a standard interface to central processing unit 206 which has been assembling image frame 1 at 1128 while image frame 2 is being received. The process repeats for the next Q-block, with a pause for the echoes from the returning wave front to disappear before a pulse is generated for the next Q-block. Once all of the Q-blocks for a frame have been transferred to the central processing unit 206, the capture of Q-blocks for the next frame is begun.

Figure 12:
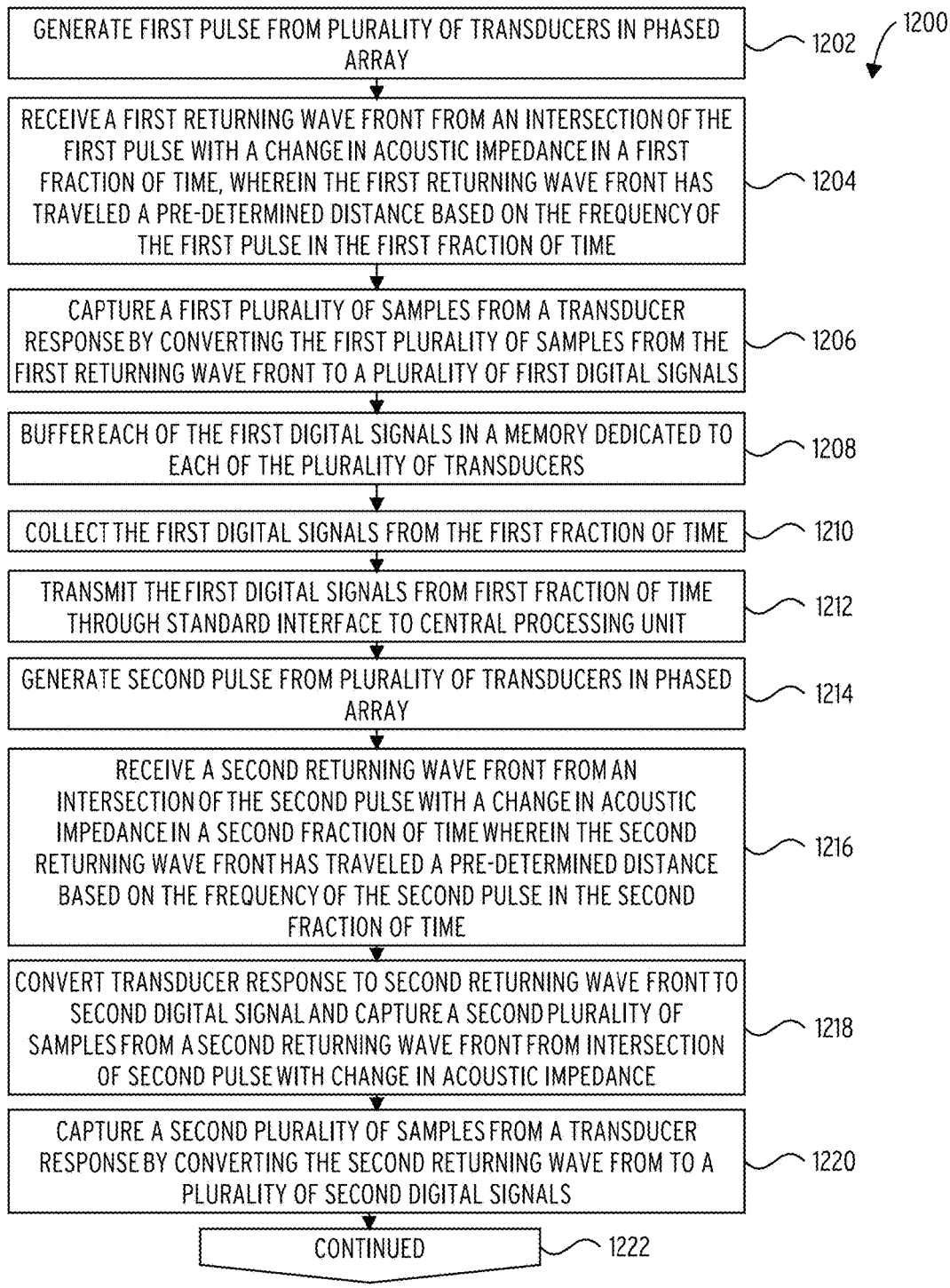
FIG. 12 illustrates a routine in accordance with one embodiment.
Figure 13:
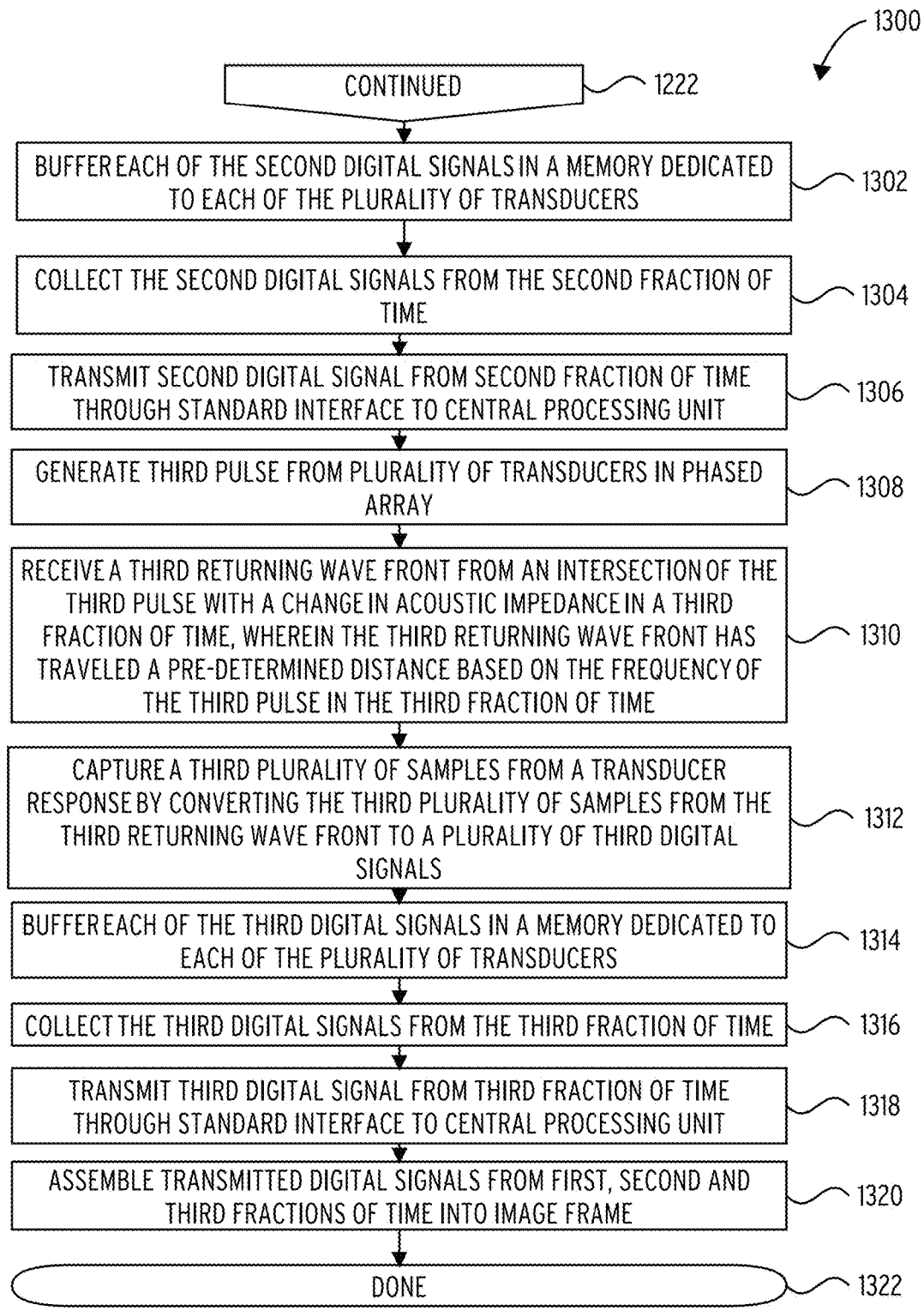
FIG. 13 illustrates a routine in accordance with one embodiment.
Figure 14:
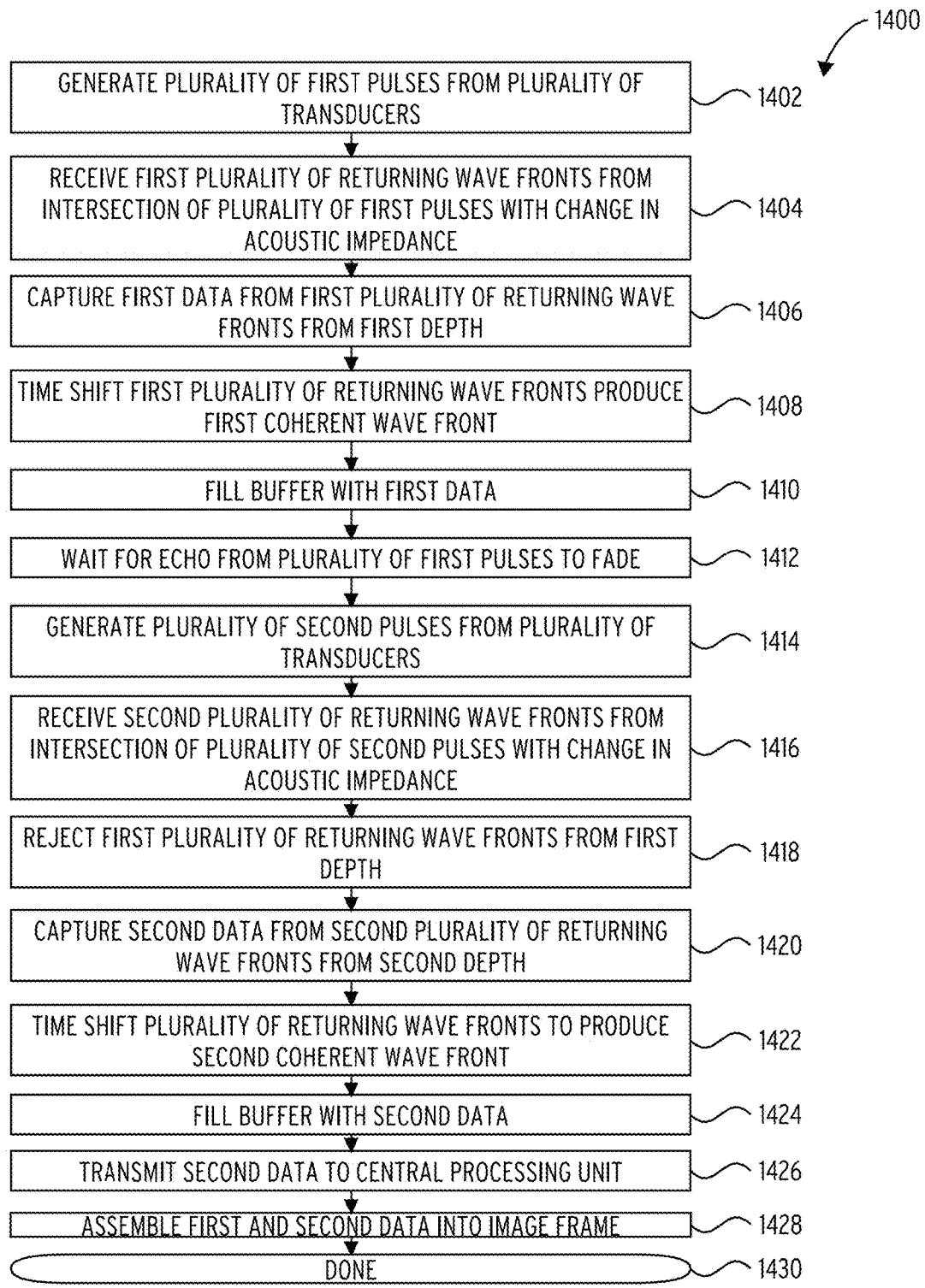
FIG. 14 illustrates a routine in accordance with one embodiment.

In block 1202, routine 1200 generates a first pulse from a plurality of transducers in a phased array. In block 1204, routine 1200 receives a first returning wave front from an intersection of the first pulse with a change in acoustic impedance in a first fraction of time, wherein the first returning wave front has traveled a pre-determined distance based on the frequency of the first pulse in the first fraction of time. In block 1206, routine 1200 captures a first plurality of samples from a transducer response by converting the first plurality of samples from the first returning wave front into a plurality of first digital signals. In block 1208, routine 1200 buffers each of the first digital signals from the first fraction of time in a buffer or other memory dedicated to each of the plurality of transducers. In block 1210, routine 1200 collects the first digital signals from the first fraction of time. In block 1212, routine 1200 transmits the first digital signal from the first fraction of time through a standard interface to a central processing unit. In block 1214, routine 1200 generates a second pulse from the plurality of transducers in the phased array. In block 1216, routine 1200 receives a second returning wave front from the intersection of the second pulse with the change in acoustic impedance in a second fraction of time, wherein the second returning wave front has traveled a pre-determined distance based on the frequency of the second pulse in the second fraction of time. In block 1218, routine 1200 converts the transducer response to the second returning wave front in the second fraction of time to a second digital signal and captures a second plurality of samples from a second returning wave front from intersection of the second pulse with the change in acoustic impedance. FIG. 12 is continued on the next page at FIG. 13, with block 1306 following directly after block 1220. In block 1302, routine 1300 buffers each of the second digital signals in a memory dedicated to each of the plurality of transducers. In block 1304, routine 1300 collects the second digital signals from the second fraction of time. In block 1306, routine 1300 transmits the second digital signal from the second fraction of time through the standard interface to the central processing unit. In block 1308, routine 1300 generates a third pulse from the plurality of transducers in the phased array. In block 1310, routine 1300 receives a third returning wave front to the intersection of the third pulse with the change in acoustic impedance in a third fraction of time, wherein the third returning wave front has traveled a pre-determined distance based on the frequency of the third pulse in the third fraction of time. In block 1312, routine 1300 captures a third plurality of samples from a transducer response by converting the third plurality of samples from the third returning wave front to a plurality of third digital signals. In block 1314, routine 1300 buffers the third digital signals from the third fraction of time. In block 1316, the third digital signals from the third fraction of time are collected. In block 1318, routine 1300 transmits the third digital signals from the third fraction of time through the standard interface to the central processing unit. In block 1320, routine 1300 assembles the transmitted digital signals from the first, second and third fractions of time into an image frame. In done block 1322, routine 1300 ends.

In block 1402, routine 1400 generates a plurality of first pulses from a plurality of transducers. In block 1404, routine 1400 receives a first plurality of returning wave fronts from an intersection of the plurality of first pulses with a change in acoustic impedance. In block 1406, routine 1400 captures a first data from the first plurality of returning wave fronts from a first depth. In block 1408, routine 1400 time shifts the first plurality of returning wave fronts produce a first coherent wave front. In block 1410, routine 1400 fills a buffer with the first data. In block 1412, routine 1400 waits for an echo from the plurality of first pulses to fade. In block 1414, routine 1400 generates a plurality of second pulses from the plurality of transducers. In block 1416, routine 1400 receives a second plurality of returning wave fronts from the intersection of the plurality of second pulses with the change in acoustic impedance. In block 1418, routine 1400 rejects the first plurality of returning wave fronts from the first depth. In block 1420, routine 1400 captures a second data from the second plurality of returning wave fronts from a second depth. In block 1422, routine 1400 time shifts the plurality of returning wave fronts to produce a second coherent wave front. In block 1424, routine 1400 fills the buffer with the second data. In block 1426, routine 1400 transmits the second data to the central processing unit. In block 1428, routine 1400 assembles the first and second data into an image frame. In done block 1430, routine 1400 ends.

Figure 15:
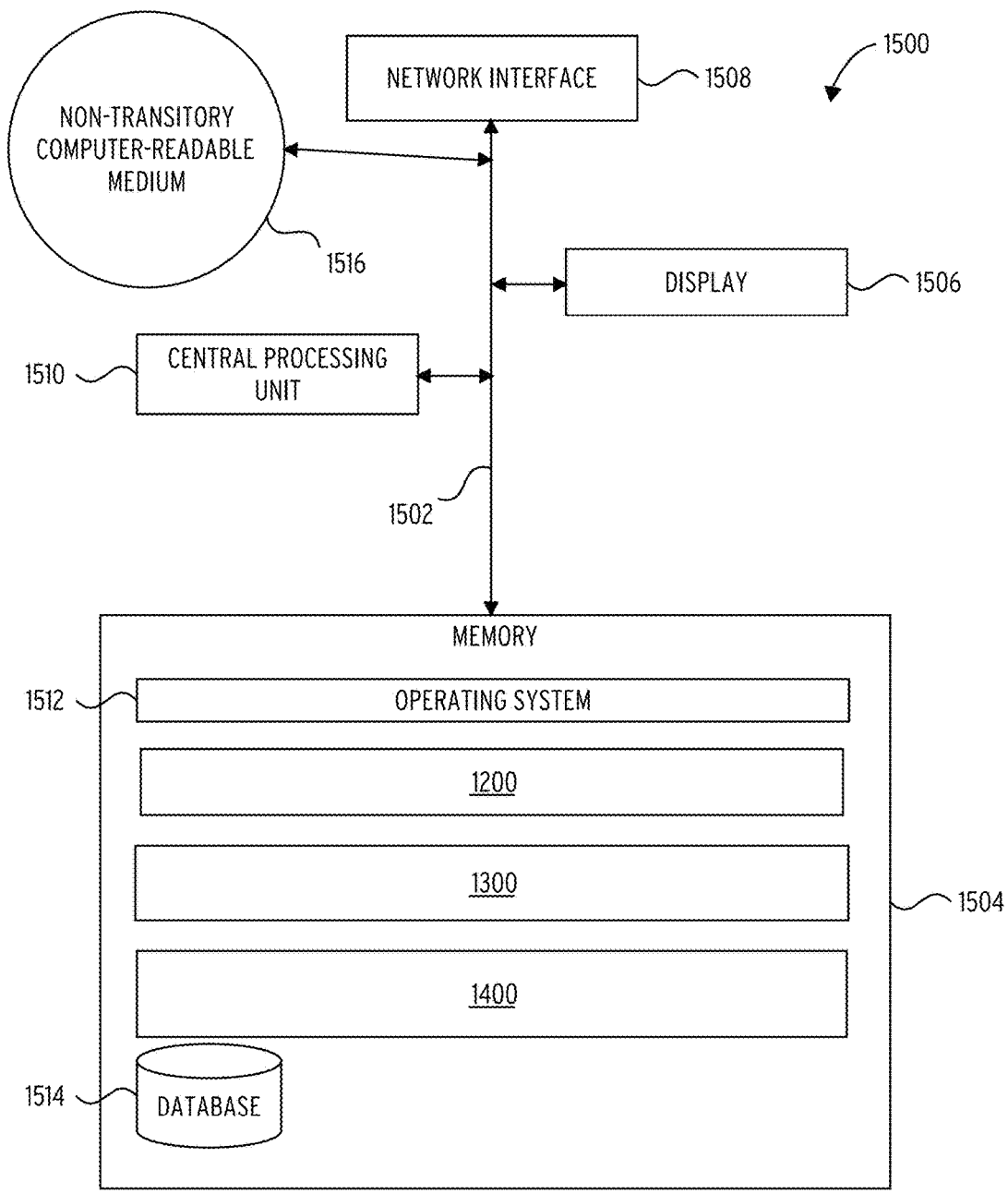
FIG. 15 illustrates a system in accordance with one embodiment.

FIG. 15 illustrates several components of an exemplary system 1500 in accordance with one embodiment. In various embodiments, system 1500 may include a desktop PC, server, workstation, mobile phone, laptop, tablet, set-top box, appliance, or other computing device that is capable of performing operations such as those described herein. In some embodiments, system 1500 may include many more components than those shown in FIG. 15. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1500 may comprise one or more physical and/or logical devices that collectively provide the functionalities described herein. In some embodiments, system 1500 may comprise one or more replicated and/or distributed physical or logical devices.

In some embodiments, system 1500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1500 includes a bus 1502 interconnecting several components including a network interface 1508, a display 1506, a central processing unit 1510, and a memory 1504.

Memory 1504 generally comprises a random access memory ("RAM") and permanent non-transitory mass storage device, such as a hard disk drive or solid-state drive. Memory 1504 stores an operating system 1512.

These and other software components may be loaded into memory 1504 of system 1500 using a drive mechanism (not shown) associated with a non-transitory computer-readable medium 1516, such as a floppy disc, tape, DVD/CD-ROM drive, memory card, or the like.

Memory 1504 also includes database 1514. In some embodiments, system 1500 may communicate with database 1514 via network interface 1508, a storage area network ("SAN"), a high-speed serial bus, and/or via the other suitable communication technology.

In some embodiments, database 1514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 16:
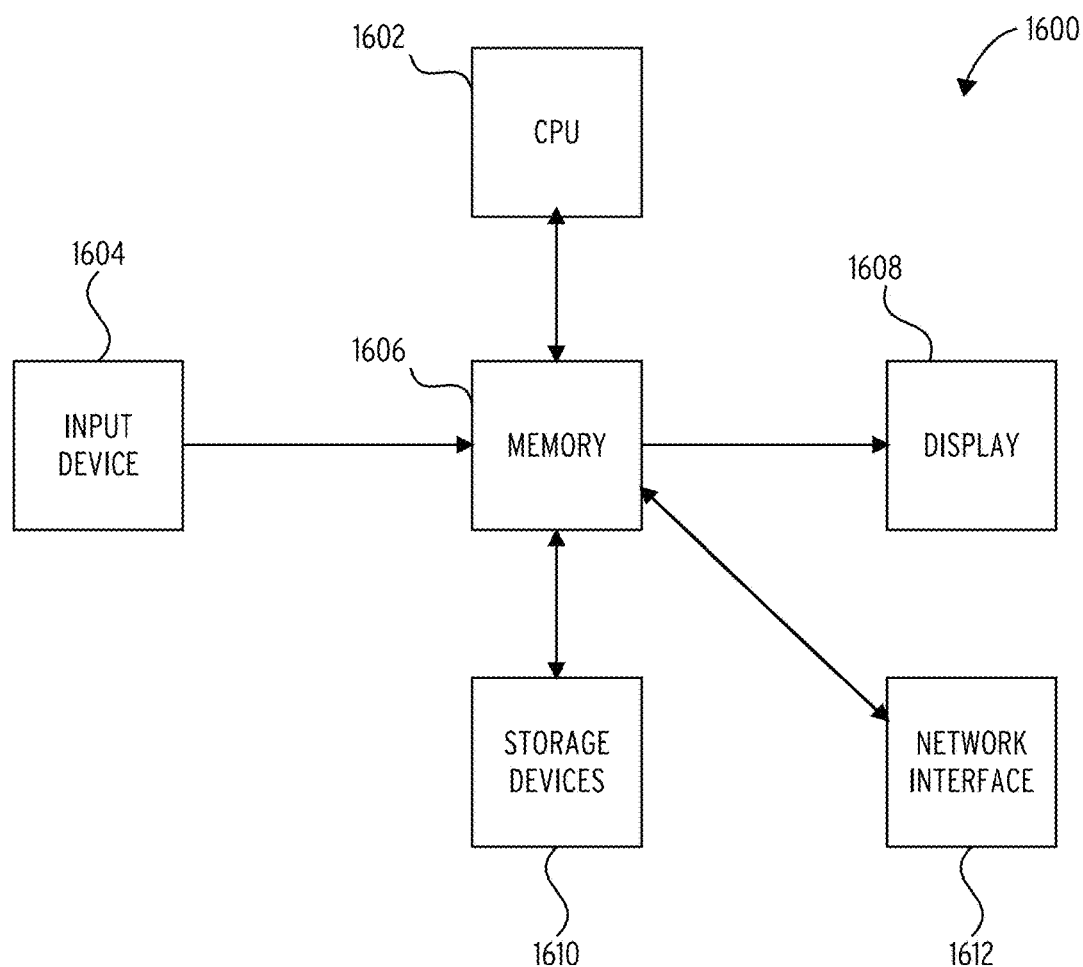
FIG. 16 illustrates an embodiment of a digital apparatus to implement components and process steps of the system described herein.

FIG. 16 illustrates an embodiment of a digital apparatus 1600 to implement components and process steps of the system described herein.

Input device 1604 comprises input transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input device 1604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input device 1604 are provided via various machine signal conductors (e.g., busses or network interfaces) and circuits to memory 1606.

The memory 1606 is typically what is known as a first or second level memory device, providing for storage (via configuration of matter or states of matter) of signals received from the input device 1604, instructions and information for controlling operation of the CPU 1602, and signals from storage devices 1610.

Information stored in the memory 1606 is typically directly accessible to the CPU 1602 of the device. Signals input to the device cause the reconfiguration of the internal material/energy state of the memory 1606, creating in essence a new machine configuration, influencing the behavior of the digital apparatus 1600 by affecting the behavior of the CPU 1602 with control signals (instructions) and data provided in conjunction with the control signals.

Second or third level storage devices 1610 may provide a slower but higher capacity machine memory capability. Examples of storage devices 1610 are hard disks, optical disks, large capacity flash memories or other non-volatile memory technologies, and magnetic memories.

The CPU 1602 may cause the configuration of the memory 1606 to be altered by signals in storage devices 1610. In other words, the CPU 1602 may cause data and instructions to be read from storage devices 1610 in the memory 1606 from which may then influence the operations of CPU 1602 as instructions and data signals, and from which it may also be provided to the display 1608. The CPU 1602 may alter the content of the memory 1606 by signaling to a machine interface of memory 1606 to alter the internal configuration, and then converted signals to the storage devices 1610 to alter its material internal configuration. In other words, data and instructions may be backed up from memory 1606, which is often volatile, to storage devices 1610, which are often non-volatile.

Display 1608 are transducers which convert signals received from the memory 1606 into physical phenomenon such as vibrations in the air, or patterns of light on a machine display, or vibrations (i.e., haptic devices) or patterns of ink or other materials (i.e., printers and 3-D printers).

The network interface 1612 receives signals from the memory 1606 and converts them into electrical, optical, or wireless signals to other machines, typically via a machine network. The network interface 1612 also receives signals from the machine network and converts them into electrical, optical, or wireless signals to the memory 1606.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily re-adapted to different purposes (e.g. read/write volatile or nonvolatile memory or media). "Firmware" refers to logic embodied as read-only memories and/or media. "Hardware" refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Embodiments of methods and systems for transferring data from a phased array to a central processing unit at a rate that a standard hardware interface can transfer to produce frequency based images with a controlled loss of information have been described. The following claims are directed to said embodiments, but do not preempt transferring data from a phased array to a central processing unit at a rate that a standard hardware interface can transfer to produce frequency based images with a controlled loss of information in the abstract. Those having skill in the art will recognize numerous other approaches to transferring data from a phased array to a central processing unit at a rate that a standard hardware interface can transfer to produce frequency based images with a controlled loss of information and/or utilized commercially, precluding any possibility of preemption in the abstract. However, the claimed system improves, in one or more specific ways, the operation of a machine system for transferring data from a phased array to a central processing unit at a rate that a standard hardware interface can transfer to produce frequency based images with a controlled loss of information, and thus distinguishes from other approaches to the same problem/process in how its physical arrangement of a machine system determines the system's operation and ultimate effects on the material environment. The terms used in the appended claims are defined herein in the glossary section, with the proviso that the claim terms may be used in a different manner if so defined by express recitation.

What is claimed is:

1. An image processing method for frequency based images comprising:

generating a first pulse from a plurality of transducers in a phased array at a location;

receiving a first returning wave front from an intersection of the first pulse with a change in acoustic impedance in a first fraction of time, wherein the first returning wave front has traveled a pre-determined distance based on the frequency of the first pulse in the first fraction of time;

capturing a first plurality of samples from a transducer response to the first returning wave front in the first fraction of time, the plurality of first samples representing a first depth of data in an image frame at the phased array location, each of the plurality of samples associated with a transducer in the phased array;

converting the first plurality of samples first digital signals, each of the first digital signals being associated with a transducer in the phased array;

buffering each of the first digital signals in a memory buffer dedicated to its associated transducer;

transmitting the first digital signals to a central processing unit;

generating a second pulse from the plurality of transducers in the phased array at the location;

receiving a second returning wave front from the intersection of the second pulse with the change in the acoustic impedance, wherein the second returning wave front has traveled a second pre-determined distance based on the frequency of the second pulse in a second fraction of time, and wherein the second fraction of time is consecutive to the first fraction of time;

capturing a second plurality of samples of the transducer response to the second returning wave front in a second fraction of time, the plurality of second samples representing a second depth of data in the image frame at the phased array location, each of the plurality of samples associated with a transducer in the phased array;

converting the second plurality of samples to second digital signals, each of the second digital signals being associated with a transducer in the phased array;

buffering each of the second digital signals in a memory buffer dedicated to its associated transducer;

transmitting the second digital signals through the interface to the central processing unit;

generating a third pulse from the plurality of transducers in the phased array at the location;

receiving a third returning wave front to the intersection of the third pulse with the change in the acoustic impedance, wherein the third returning wave front has traveled a third pre-determined distance based on the frequency of the third pulse in the third fraction of time, and wherein the third fraction of time is consecutive and subsequent to the second fraction of time;

capturing a third plurality of samples of the transducer response to the third returning wave front in a third fraction of time, the plurality of third samples representing a third depth of data in the image frame at the phased array location, each of the plurality of samples associated with a transducer in the phased array;

converting the third plurality of samples to third digital signals, each of the third digital signals being associated with a transducer in the phased array;

buffering each of the third digital signals in the memory buffer dedicated to its associated transducer;

transmitting the third digital signals through the interface to the central processing unit; and assembling the first, second and third digital signals into the image frame, the image frame representing the first, second and third depth of data at the phased array location.

2. The image processing method of claim 1, wherein the first pulse, the second pulse and the third pulse are at different frequencies.

3. The image processing method of claim 1, wherein the first pulse, the second pulse and the third pulse are at a same frequency.

4. The image processing method of claim 1, wherein the first fraction of time, the second fraction of time and the third fraction of time overlap.

5. The image processing method of claim 1, wherein the plurality of samples is the sample rate.

6. The image processing method of claim 1, wherein each of the samples in the plurality of samples may be captured at the same or different instances of time within each of the fractions of time.

7. The image processing method of claim 1, wherein each transducer in the plurality of transducers has a dedicated memory in a memory cache.

8. The image processing method of claim 7, wherein a size of the dedicated memory per transducer is constant for a given image quality.

9. The image processing method of claim 1, wherein the memory receives the digital signals at a higher rate than are compatible with the data communication capabilities of the standard interface.

10. A method for memory optimization for data received from a phased array comprising:

generating a plurality of first pulses from a plurality of transducers of the phased array at a location;

receiving a first plurality of returning wave fronts from an intersection of the plurality of first pulses with a change in acoustic impedance;

capturing a first data set from the first plurality of returning wave fronts from a first depth, the first data set including data associated with each transducer in the phased array;

time shifting the first plurality of returning wave fronts to produce a first coherent wave front;

filling a buffer with the first data set, the buffer including a memory buffer dedicated to and associated with each transducer of the phased array store data, the data of the first data set being stored in the memory buffer of its associated transducer;

waiting for an echo from the plurality of first pulses to fade;

generating a plurality of second pulses from the plurality of transducers of the phased array at the location;

receiving a second plurality of returning wave fronts from the intersection of the plurality of second pulses with the change in acoustic impedance;

rejecting the first plurality of returning wave fronts from the first depth;

capturing a second data set from the second plurality of returning wave fronts from a second depth, the second data set including data associated with each transducer in the phased array;

time shifting the plurality of returning wave fronts to produce a second coherent wave front;

filling the buffer with the second data set, the data of the second data set being stored in the memory buffer of its associated transducer; wherein when the buffer is filling with the second data set, the first data set is being transmitted to a central processing unit;

transmitting the second data set to the central processing unit; and assembling the first and second data sets into an image frame representing data from the first and second depth at the same phased array location, wherein the method for memory optimization is repeated for each image frame.

11. The method for memory optimization of claim 10, wherein each transducer in the plurality of transducers has a dedicated memory in a memory cache.

12. The method for memory optimization of claim 11, wherein a size of the dedicated memory is larger for transducers on the edge of the phased array than for transducers in a middle of the phased array.

13. The method for memory optimization of claim 10, wherein the plurality of first pulses and the plurality of second pulses are at different frequencies.

14. The method for memory optimization of claim 10, wherein a frequency for the plurality of first pulses is optimized for the first depth.

15. The method for memory optimization of claim 10, wherein a frequency for the plurality of second pulses is optimized for the second depth.

16. The method for memory optimization of claim 10, wherein the first depth and the second depth overlap.

17. The method for memory optimization of claim 10, wherein the first depth and the second depth are distinct.

* * * * *